United States Patent
Devassy et al.

(10) Patent No.: US 12,307,540 B2
(45) Date of Patent: May 20, 2025

(54) SYSTEMS AND METHODS FOR VERIFYING PROVIDER-RELATED INFORMATION

(71) Applicant: Lyft, Inc., San Francisco, CA (US)

(72) Inventors: Joan Devassy, San Mateo, CA (US); Brian Scott Peterson, San Francisco, CA (US); Suresh Pragada, Dublin, CA (US); Namit Raisurana, San Carlos, CA (US); Neil Pradip Shah, San Carlos, CA (US)

(73) Assignee: Lyft, Inc., San Francisco, CA (US)

( * ) Notice: Subject to any disclaimer, the term of this patent is extended or adjusted under 35 U.S.C. 154(b) by 831 days.

(21) Appl. No.: 16/894,427

(22) Filed: Jun. 5, 2020

(65) Prior Publication Data
US 2021/0383496 A1 Dec. 9, 2021

(51) Int. Cl.
| | |
|---|---|
| G06Q 50/40 | (2024.01) |
| G06F 16/9035 | (2019.01) |
| G06N 20/00 | (2019.01) |
| G06V 40/16 | (2022.01) |
| H04W 4/48 | (2018.01) |

(52) U.S. Cl.
CPC ......... *G06Q 50/40* (2024.01); *G06F 16/9035* (2019.01); *G06N 20/00* (2019.01); *G06V 40/16* (2022.01); *H04W 4/48* (2018.02)

(58) Field of Classification Search
CPC ..... G06Q 50/30; H04W 4/48; G06F 16/9035; G06N 20/00; G06V 40/16
USPC .............................................................. 705/5
See application file for complete search history.

(56) References Cited

U.S. PATENT DOCUMENTS

| | | | |
|---|---|---|---|
| 10,573,184 B1* | 2/2020 | Pandit | G08G 1/207 |
| 2016/0101783 A1* | 4/2016 | Abou-Nasr | B60W 40/08 |
| | | | 340/5.82 |
| 2017/0011571 A1* | 1/2017 | Boles | G07C 9/30 |
| 2018/0003516 A1* | 1/2018 | Khasis | G08G 1/207 |

OTHER PUBLICATIONS

"Vehicle route prediction and time of arrival estimation techniques for improved transportation system management" Published by IEEE (Year: 2003).*

* cited by examiner

*Primary Examiner* — Zeina Elchanti
(74) *Attorney, Agent, or Firm* — Greenberg Traurig, LLP

(57) ABSTRACT

The disclosed computer-implemented method may include receiving, at a transportation management system, driving data associated with a computing device. The method may further include detecting, in response to receiving the driving data, a deviation from a transportation profile associated with the computing device. The method may also include sending, in response to detecting the deviation at the transportation management system, at least one transportation notification. Various other methods, systems, and computer-readable media are also disclosed.

20 Claims, 14 Drawing Sheets

SYSTEMS AND METHODS FOR VERIFYING PROVIDER-RELATED INFORMATION

BACKGROUND

Passenger safety is a fundamental concern of transportation management systems. Passengers want to know that the person providing their ride is trustworthy and responsible, and administrators want to ensure that only vetted and fit drivers service transportation requests. Unfortunately, drivers have at times attempted to evade screening procedures designed to ensure passenger safety. For example, an approved driver may begin a session as a transportation provider and then switch places with an unauthorized driver in an attempt to allow that person to drive in their place. Similarly, a driver may have been removed from the transportation management system as a valid provider, but may attempt to provide a false identity or use other means to regain approval as a valid provider.

In other cases, drivers may attempt to provide rides when they themselves are not fit to drive. For example, a driver may be fatigued, or may be abusing substances, or may be distracted with pressing personal issues. In such cases, the passenger's safety could be compromised by the driver's undesirable mental or physical state.

The present disclosure, however, details a variety of approaches to ensuring passenger safety, including methods for detecting and preventing fraudulent drivers from providing rides and/or methods for preventing drivers from servicing transportation requests when operating below their normal mental or physical capacity.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
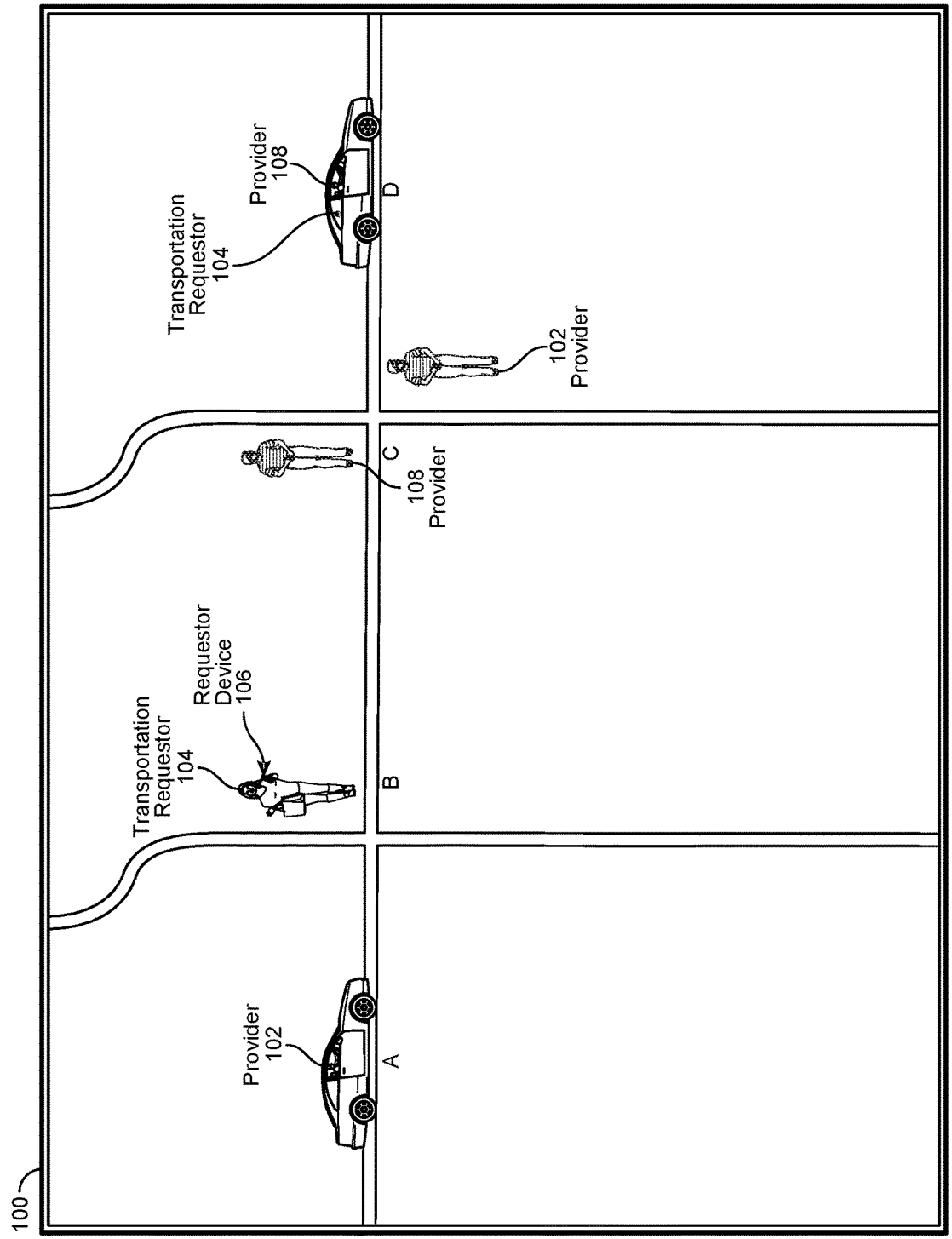
FIG. 1 is an illustration of an example scenario involving a transportation requestor and multiple possible transportation providers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes a novel approach to detecting and potentially remediating a variety of factors that can impact passenger safety, including transportation provider fraud (where transportation providers attempt to impersonate others), transportation provider fatigue/impairment, distracted providers, and/or other external events (such as weather, road conditions, etc.). At a high level, this approach involves generating and applying transportation profiles, and detecting deviations in transportation profiles and sending notifications in response to the detected deviations.

As noted above, passenger safety is critical to ensuring passenger satisfaction and trust. When a transportation requestor requests transportation via a ridesharing platform, that requestor wants to know that the person operating the vehicle is licensed, is fit to drive, and is known to the ridesharing platform. To that end, the present disclosure describes various approaches to detecting and potentially remediating a variety of factors that can impact the safety of transportation requestors. For example, the embodiments described herein may be designed to identify and reduce provider fraud, so that transportation providers cannot get away with impersonating other providers. Still further, the embodiments described herein may be configured to identify and reduce situations in which a transportation provider is driving while fatigued or impaired. Moreover, the embodiments described herein may be configured to identify internal or external distractions or identify weather conditions or road conditions that may prevent the transportation provider from safely operating the vehicle.

Each of these processes may be carried out using sensor data received from a variety of different sensors. For example, the embodiments described herein may gather telemetry data from the vehicle operated by the transportation provider (via, e.g., an on-board diagnostics (OBD) port), and/or from mobile electronic devices associated with the transportation provider and/or with the transportation requestor. This telemetry data may be analyzed to derive a "transportation profile" that distinguishes or even uniquely identifies transportation providers based on their driving habits. For instance, this identification may identify a provider's propensity to drive or accelerate quickly or slowly, to corner quickly or slowly, to weave through traffic, or perform other maneuvers in a consistent, identifiable manner. In some examples, this telemetry data may be correlated with location and/or ride-history information to further identify driving habits on certain types of roads (e.g., highways versus city streets), in certain locations (e.g., urban versus rural settings), at different stages within the ride experience (e.g., with or without transportation requestors present in the vehicle), etc.

After collecting enough driving data, each provider's driving habits may be distinguished from other providers' habits, thus providing a transportation profile with which to distinguish the provider from other providers. If, after establishing this transportation profile, the transportation management system monitoring the provider detects a deviation in driving behavior (i.e., when the provider's current driving behavior deviates substantially from their expected driving behavior, as established by their transportation profile), then the transportation management system may perform a variety of different actions in an attempt to determine the underlying cause for the deviation (and, if necessary, perform remedial actions).

For example, if the transportation management system detects a deviation in driving behavior, the transportation system may issue one or more challenges or requests to the transportation provider and/or to any associated transportation requestors. These challenges and requests can take a variety of forms, including a provider ID challenge (that asks, e.g., the provider to verify themselves within a predetermined period of time by taking a "selfie", by passing a 3D facial recognition challenge, by providing a copy of their driver's license, by speaking to a live operator, etc.), a provider fatigue/impairment challenge (that asks, e.g., the provider to pass an impairment/fatigue exam administered by an application on the provider's mobile device and/or using a car-mounted, inward-facing camera), a transportation requestor request (e.g., a request that asks transportation requestors to confirm whether the provider's appearance matches their profile picture, whether the provider is behaving erratically, etc.), or the like.

The transportation management system may then perform a variety of remedial actions depending on the results of these challenges or requests. For example, if the transportation provider fails a provider ID challenge or a fatigue/impairment challenge, then the provider may be warned, suspended, offboarded, etc. If, however, the provider passes these challenges, then the transportation system may prompt the provider to submit a report identifying the underlying problem (e.g., unruly passengers, weather conditions, car problems, etc.) By taking these steps, the transportation system may improve provider and transportation requestor safety by quickly and efficiently identifying and removing fraudulent and reckless drivers, resulting in improved passenger confidence and trust.

The term "transportation provider," as used herein, may refer to any entity that operates or drives a vehicle, either wholly or in part. The term "transportation requestor," as used herein, may refer to any entity that is to ride in a ridesharing vehicle, including a person, a package, a meal, an item (e.g., a bike), or other object. While many of the embodiments described herein may refer to a transportation provider or transportation requestor performing an action, it will be understood that, in at least some of these cases, the actions may be accomplished through use of an electronic device (e.g., a mobile phone) associated with that provider or requestor.

In some cases, as noted above, transportation providers (or simply "providers" herein) may attempt to provide rides to transportation requestors within a dynamic transportation management system, even though the providers are either not registered with the transportation system or have been removed from the system. Such providers may present a risk to both transportation requestors and the dynamic transportation management system as a whole, as these providers may not have been vetted, or may have been previously removed from the transportation system for various reasons. Unknown providers may be unreliable, or unlicensed to drive, or may otherwise be unsuitable for providing rides to would-be transportation requestors. Moreover, these unknown providers may be insurance risks, which may increase expenses and overhead for dynamic transportation management systems.

FIG. 1, for example, illustrates an embodiment 100 in which a transportation provider attempts to switch places with another provider. The provider 102 at point A may accept a ride request issued to an electronic device associated with the provider 102 by the dynamic transportation management system. The transportation requestor (or simply "requestor" herein) may have requested a ride through the dynamic transportation management system using her mobile computing device 106, and the transportation system may have matched requestor 104 with provider 102. At point B, the provider 102 may pick up the requestor 104 and may drive to point C. At point C, unbeknownst to the dynamic transportation management system, the provider 108 may switch places with the provider 102. As such, at point D, the provider 108 may be providing the ride to the requestor 104, and the provider 102 may be riding as a passenger or may no longer be in the vehicle. Of course, a switch between providers may also occur without a passenger in the car, or at any time before, after, or during a ride.

Still further, other would-be transportation providers may attempt to use someone else's mobile device, or may attempt to disguise themselves under a false identity to obtain a position as an approved provider within the transportation system. Transportation providers may use many different ways to attempt to defraud the dynamic transportation management system and provide rides surreptitiously within the transportation system. Moreover, providers that are approved may be driving in an unsafe manner. For example, the providers may be driving too fast, or may be driving fatigued, or may be driving under the influence of alcohol or drugs, or may be distracted by music or by the radio or by a child within the vehicle.

The embodiments described herein may be configured to identify typical driving behavior for a provider and then determine when that provider is driving abnormally or when a different provider is posing as the provider. Identifying this abnormal driving behavior may indicate that the provider is distracted or fatigued, or may indicate that a different provider is actually driving the vehicle. Thus, as will be described in FIGS. 2-9, the embodiments described herein may establish transportation profiles for transportation providers to help identify the providers and determine when they are driving in an atypical fashion. Moreover, the embodiments described herein may issue notifications that challenge the provider to verify their identity upon determining that the provider is driving sufficiently different than their transportation profile would otherwise indicate.

As will be explained in greater detail below, in some examples the above-described concepts may leverage, utilize, and/or be implemented within a dynamic transportation management system. This dynamic transportation management system may arrange transportation on an on-demand and/or ad-hoc basis by, e.g., matching one or more transportation requestors and/or transportation requestor devices with one or more transportation providers and/or transportation provider devices. For example, a dynamic transportation management system may match a transportation requestor to a transportation provider that operates within a dynamic transportation network.

In some examples, available sources of transportation within a dynamic transportation network may include vehicles that are owned by an owner and/or operator of the dynamic transportation management system. Additionally or alternatively, sources of transportation within a dynamic transportation network may include vehicles that are owned outside of the dynamic transportation network but that participate within the dynamic transportation network by agreement. In some examples, the dynamic transportation network may include lane-bound vehicles (e.g., cars, light trucks, etc.) that are primarily intended for operation on roads. Furthermore, the dynamic transportation network may include personal mobility vehicles (PMVs) and/or micro-mobility vehicles (MMVs) that are not bound to traditional road lanes, such as scooters, bicycles, electric scooters, electric bicycles, and/or any other suitable type of PMV and/or MMV. In some embodiments, a dynamic transportation network may include autonomous vehicles (e.g., self-driving cars) that may be capable of operating with little or no input from a human operator.

Figure 2:
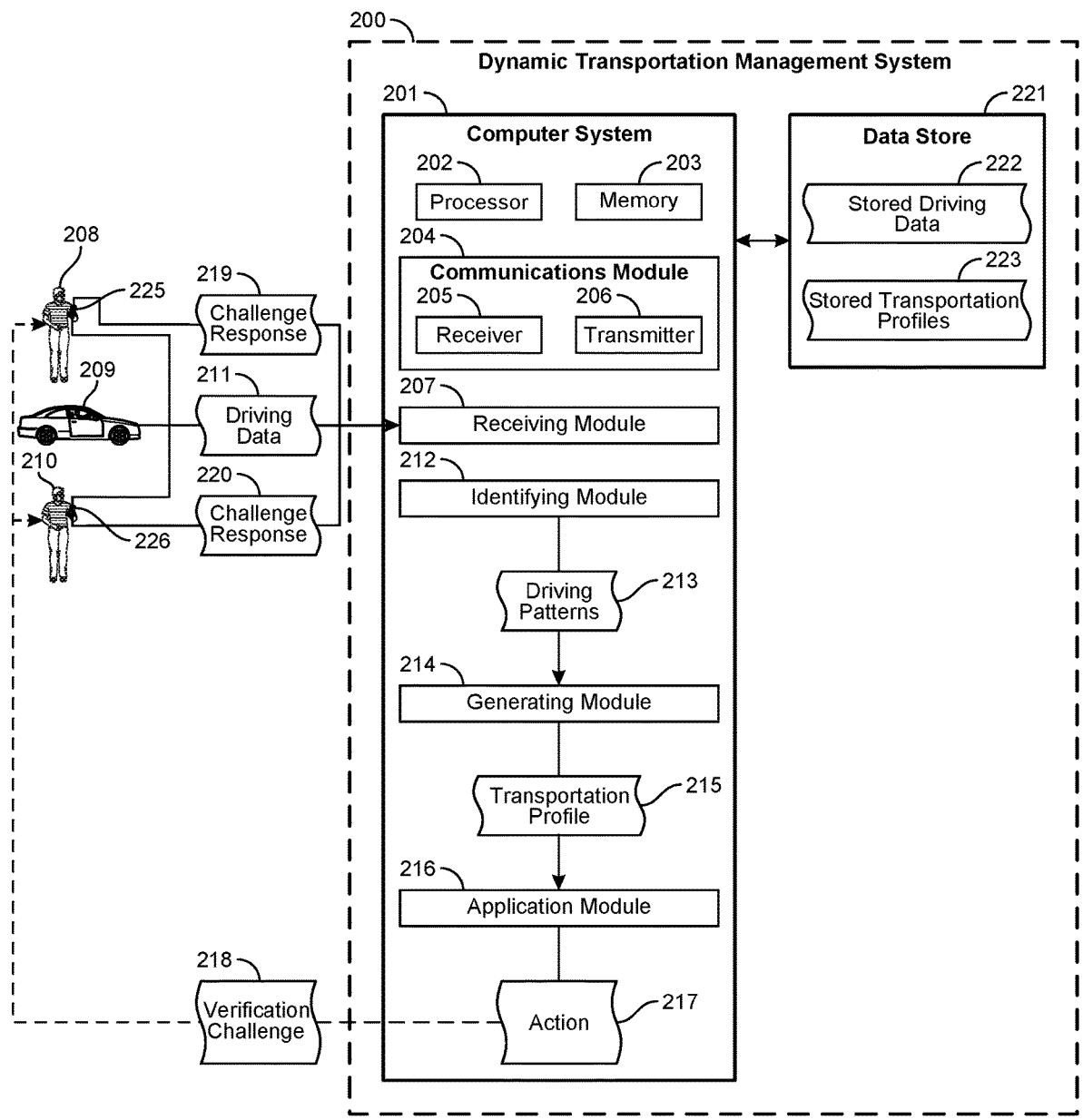
FIG. 2 is an illustration of an example architecture for creating and verifying a transportation profile.

FIG. 2 illustrates an embodiment of a dynamic transportation management system 200. The dynamic transportation management system 200, as described further below with regard to FIGS. 10 and 13-14, may be configured to facilitate ride sharing among transportation requestors and providers. The dynamic transportation management system 200 may include a computer system 201 with various modules for performing different tasks. The computer system 201 may include software modules, embedded hardware components such as hardware processors, or may include a combination of hardware and software. The computer system 201 may include substantially any type of computer system including a single, local computer system or a distributed (e.g., cloud) computer system with many different nodes.

In some cases, the computer system 201 may include at least one processor 202 and at least some system memory 203. The computer system 201 may include program modules for performing a variety of different functions. The program modules may be hardware-based, software-based, or may include a combination of hardware and software. Each program module may use computing hardware and/or software to perform specified functions, including those described herein below. The computer system 201 may also include a communications module 204 that is configured to communicate with other computer systems. The communications module 204 may include any wired or wireless communication means that can receive and/or transmit data to or from other computer systems. These communication means may include hardware interfaces including Ethernet adapters, WIFI adapters, hardware radios including, for example, a hardware-based receiver 205, a hardware-based transmitter 206, or a combined hardware-based transceiver capable of both receiving and transmitting data. The radios may be cellular radios, Bluetooth radios, global positioning system (GPS) radios, or other types of radios. The communications module 204 may be configured to interact with databases, mobile computer devices (such as mobile phones or tablets), embedded, or other types of computer systems.

The computer system 201 may also include a receiving module 207. The receiving module may be configured to receive driving data 211 from various sources. For example, the receiving module 207 of computer system 201 may receive driving data 211 from an electronic device (e.g., a mobile phone or tablet) associated with a transportation provider (e.g., 208). Additionally or alternatively, the receiving module 207 may receive driving data 211 from the vehicle itself 209. In such cases, the driving data may come from a computer system within the vehicle or from a computing device plugged into the vehicle, and/or from various hardware or software modules within the computer system in the vehicle. Still further, in some cases, the driving data 211 may be received from an electronic device associated with a transportation requestor (e.g., 210).

Figure 3:
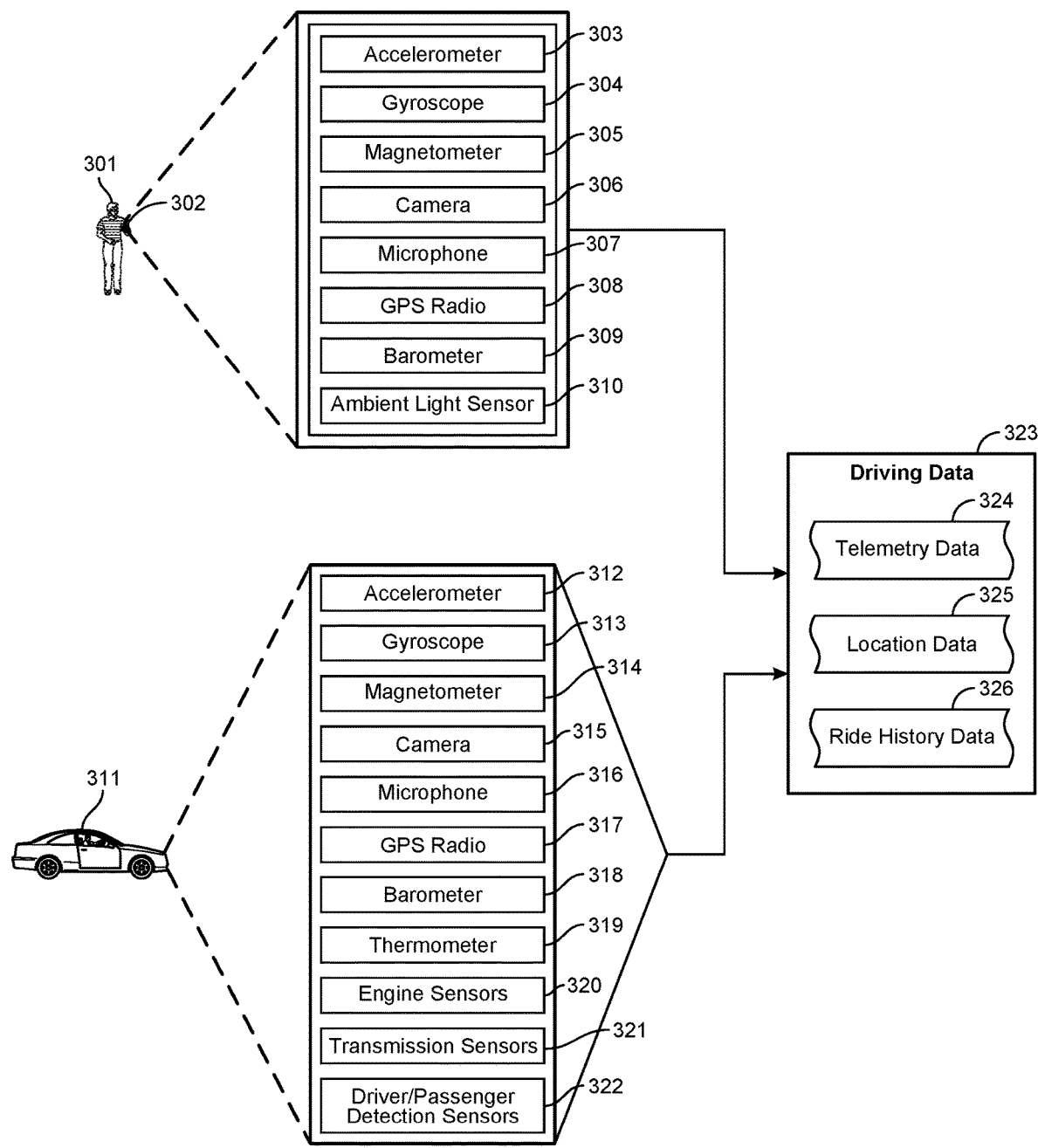
FIG. 3 is an illustration of various example sensors and electronic devices and modules that may collect and provide driving data.

The driving data 211 may include multiple different types of data related to how the transportation provider 208 is operating the vehicle, conditions related to the interior or the exterior of the vehicle, and/or conditions related to the transportation provider 208 or to the transportation requestor 210. FIG. 3, for example, lists some (but not all) of the many potential sources of information that may be the sources of driving data 323. Some of the sensors provided on a mobile electronic device 302, for example, associated with a transportation provider 301 may include an accelerometer 303, a gyroscope 304, a magnetometer 305, a camera 306, a microphone 307, a global positioning system (GPS) radio 308, a barometer 309, and an ambient light sensor 310 among other sensors. The accelerometer 303, for example, may provide telemetry data 324 (which may be part of driving data 323) including acceleration rate, deceleration rate, average acceleration, and other similar measurements. The gyroscope 304 may provide indications of how fast a vehicle is turning, stopping, starting, how often sudden moves occur and the degree to which those sudden moves occur, and other information about the movement of the vehicle (or at least the movement of the mobile electronic device 302 within the vehicle).

The magnetometer 305 may be configured to measure the Earth's magnetic field and, more specifically, the mobile device's orientation with respect to that magnetic field. The magnetometer 305 may provide magnetic readings that may be used as part of an electronic compass. The magnetic field readings of the magnetometer 305 may be combined with acceleration measurements from the accelerometer 303 and/or the gyroscope 304 to create a comprehensive picture of movement of the mobile device 302. The camera 306 may be facing externally or internally (or both if multiple cameras are used) and may provide image information from the interior or exterior of the vehicle. This information may provide road condition information, information regarding potential distractions inside or outside the vehicle including pedestrians, vehicles, passengers, etc. The microphone 307 may similarly provide information about what is occurring inside or outside the vehicle. The microphone data may also be used to determine the mobile device's current location based on sounds that are identifiable to a specific location.

The GPS radio 308 of the mobile electronic device 302 may be configured to provide current and/or past location information including current or past GPS coordinates, rate of travel information, altitude, or other location-based data 325. The barometer 309 may be configured to provide barometric pressure readings, which may be used to determine current weather or changes in weather patterns. In some cases, these weather patterns may influence the driving of a transportation provider, and as such may be combined into the driving data 323. Still further, the ambient light sensor 310 of mobile device 302 may be configured to detect the amount of light currently available around the mobile device 302. This indication of the amount of ambient light may provide an indication of how much light was available while the user was driving. Dusk, dawn, daylight, or night may each have various effects on how the transportation provider operates the vehicle.

The vehicle itself (311) may have its own set of sensors that are separate from the sensors and modules in the mobile device 302. The sensors shown in FIG. 3 are, again, merely examples of possible sensors, and more or fewer vehicle sensors may be implemented in any given embodiment. The vehicle may include an accelerometer 312, a gyroscope 313, a magnetometer, a camera 315 (internal and/or external), a microphone 316 (internal and/or external), a GPS radio 317, a barometer 318, a thermometer 319, engine sensors 320, transmission sensors 321, provider/requestor detection sensors 322, or other sensors. Any or all of these sensors may provide measurements or information used as part of driving data 323. Many of the sensors 312-318 perform functions similar to or the same as those described above with respect to the sensors of the mobile device 302. The thermometer 319 may indicate a current temperature inside or outside the vehicle 311. This temperature data may indicate how and whether the transportation provider operates the vehicle differently in different temperatures or in different weather (e.g., snow, rain, ice, etc.).

The engine sensors 320 in vehicle 311 may include revolutions per minute (RPM) sensors, torque sensors, timing sensors, gas detection sensors, combustion sensors, gas mileage sensors, engine temperature sensors, oil temperature sensors, air flow sensors, or other types of sensors associated with the engine. The transmission sensors 321 may include temperature sensors, torque sensors, shift timing data, or other data related to power transfer and/or gear selection. Other sensors related to the suspension, steering, tire pressure, or overall operation of the vehicle may also be used to provide driving data 323. Still further, the provider/requestor detection sensors 322 may provide an indication of when users are sitting in various seats and which seats are occupied at any given time. Other sensors may also be used including sensors embedded in or part of notification devices including in-dash devices that provide identification of a transportation provider or the provider's vehicle, or provide messages for the intended transportation requestor. Such notification devices may provide sensor data including microphone data, camera data, notification data, or other types of data.

Any or all of this sensor information may be used to provide telemetry data 324 indicating movement of the vehicle or location data 325 indicating the current location and conditions of the road and/or environment of the vehicle. Over time, any or all of this data may be stored as ride history data 326 indicating, for each trip, how the vehicle was operated, where the vehicle was operated, and what the conditions were like, both outside the vehicle and inside the vehicle, including an indication of which seats were occupied during any given ride. Accordingly, using data from mobile device sensors (from transportation provider or transportation requestor mobile devices) and/or using data from vehicle sensors, the computer system 201 of FIG. 2 may access a great deal of information related to the driving habits of an individual transportation provider. Moreover, as will be described further below, using this sensor data, the computer system 201 may identify driving patterns and other indicators that may uniquely identify the transportation provider simply by analyzing the driving data 323 and comparing current driving patterns to previous, stored driving patterns.

Returning to FIG. 2, the computer system 201 may include an identifying module 212 that is configured to identify driving patterns associated with a computing device 225 that is associated with transportation provider 208. The driving patterns 213 may be based on the driving data 211 (or 323 of FIG. 3) from any of the sensors in the transportation provider's computing device 225 and/or from any of the sensors in the vehicle 209. The driving patterns 213 may indicate, as the name implies, various tendencies or methods or habits or patterns associated with the way the transportation provider operates the vehicle 209.

For example, the driving patterns 213 may indicate how hard the transportation provider typically corners or accelerates, how often they rev the engine (and how far and how long), how quickly they stop, how fast they drive, how often they speed and by how much, how often they drive below the speed limit, how often they stay within the driving lanes, how often they come to a complete stop at stop signs or stop lights, how often they honk their horn, how often they use their turn signal (as detected by a microphone), or how they operate the vehicle in different conditions including in the city versus in the suburbs, on the freeway in a traffic jam, at nighttime or in the daylight, in the rain or in the snow, whether they are en route to a pickup or whether they haven't accepted any transportation requests, whether they currently have a transportation requestor in the vehicle or are alone, whether they have a package or meal that is out for delivery, whether they are just starting a shift or are nearing the end of a shift, etc. Many different factors and data may be monitored and implemented to create a transportation profile that is unique to a given transportation provider.

The identifying module 212 may be configured to look at the driving data 211 from any or all of the sensors identified in FIG. 3 (or other sensors from other devices such as transportation requestor devices, traffic cameras, sensors on other providers' vehicles, etc.) and construct a driving pattern 213 that distinguishes the transportation provider from other transportation providers and, in some cases, uniquely identifies the transportation from a plurality of other transportation providers. The driving patterns 213 may look at substantially any combination of sensor data over substantially any period of time to build a comprehensive set of driving patterns 213 that identify how the transportation provider operates the vehicle in a variety of different situations and conditions. This driving patterns 213 may then be used by the dynamic transportation management system 200 to determine whether a given transportation provider is authentic—that is, used to determine whether the transportation provider is who they say they are. This may be accomplished by comparing current driving patterns to past stored driving data 222 including stored driving patterns potentially stored in data store 221 or some other local or remote data store. These concepts will be explained in greater detail below with regard to FIGS. 8, 9, and 12.

After the identifying module 212 has identified one or more driving patterns 213 associated with a computing device 225 associated with the transportation provider 208, the generating module 214 of computer system 201 may generate a transportation profile 215 based on the identified driving patterns 213. The transportation profile 215 may incorporate information about the computing device 225 and/or about the transportation provider 2018. The transportation profile 215 may include, for example, information that identifies the transportation provider such as name, address, birth date, email address, driver's license number, etc., as well as other characteristics, traits, tendencies, habits, or other information derived from the driving patterns 213. The application module 216 may then perform some type of action 217 including applying the transportation profile 215 within the dynamic transportation management system 200.

This application of the transportation profile 215 may include sending a notification to the computing device 225 associated with the transportation provider 208, sending a verification challenge 218 to the computing device 225, storing the transportation profile in the data store 221 (e.g., in stored transportation profiles 223), or performing some other type of action within the dynamic transportation management system 200.

Figure 4A:
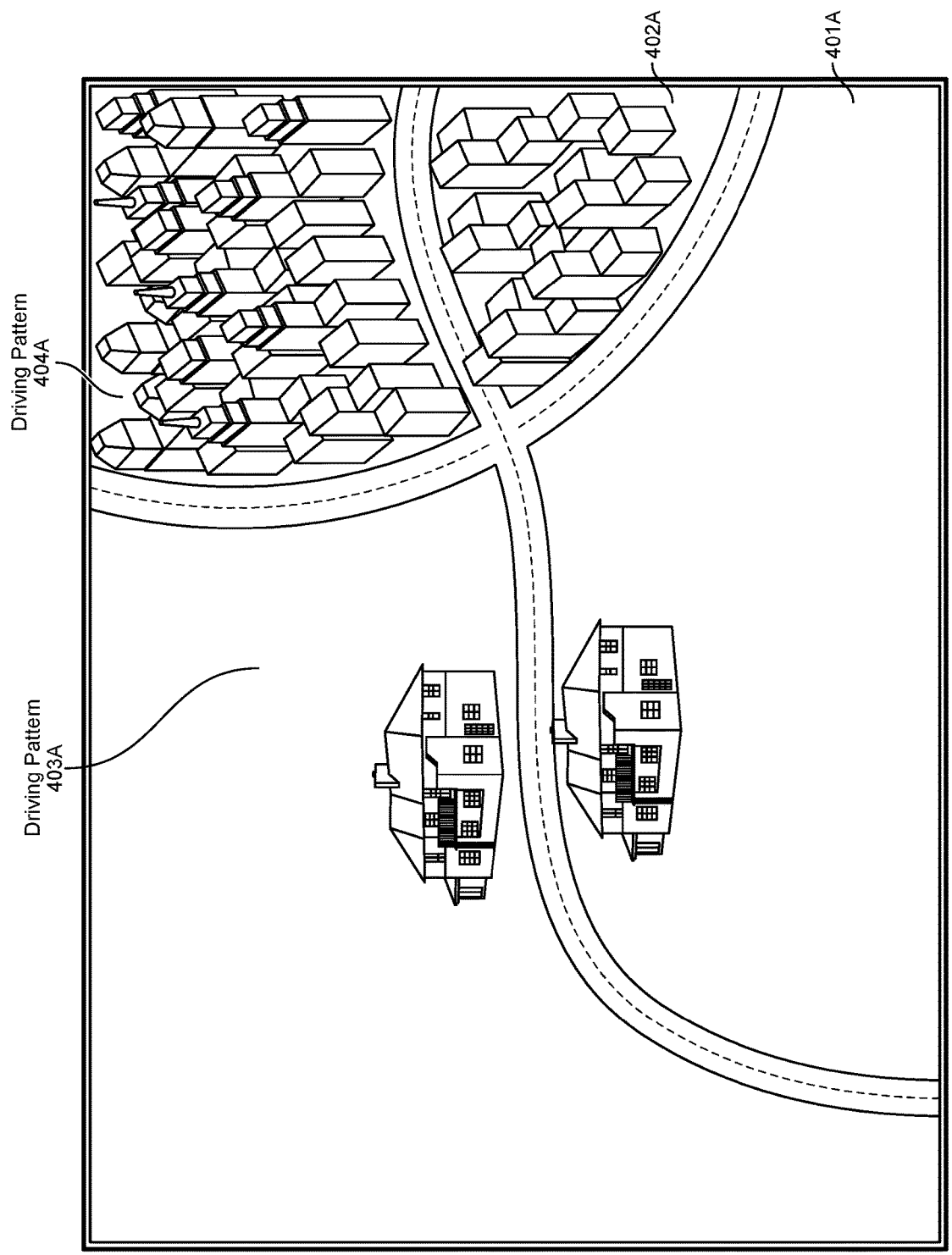
FIGS. 4A-4D illustrate embodiments in which driving patterns are identified in different environments.

Turning now to FIG. 4A, an embodiment is illustrated in which different driving patterns 403A/404A are generated for different locations or road types. These driving patterns are used to generate the transportation profile (e.g., 215 of FIG. 2) which, in turn, may be used to identify erratic driving behaviors and thus identify fraudulent providers within the dynamic transportation management system 200. The driving patterns 403A/404A may be different for different conditions and in different scenarios. For example, the driving patterns 403A/404A may be specific to a geographic location. In FIG. 4A, for instance, the driving pattern 403A is associated with a more rural, suburban landscape 401A, while the driving pattern 404A is associated with a more densely populated, city landscape 402A. Transportation providers may tend to drive differently in the city than they would in suburbs or out in open country. As such, the location in which the transportation provider is driving may be taken into consideration when generating the driving patterns 403A/404A.

Figure 4B:
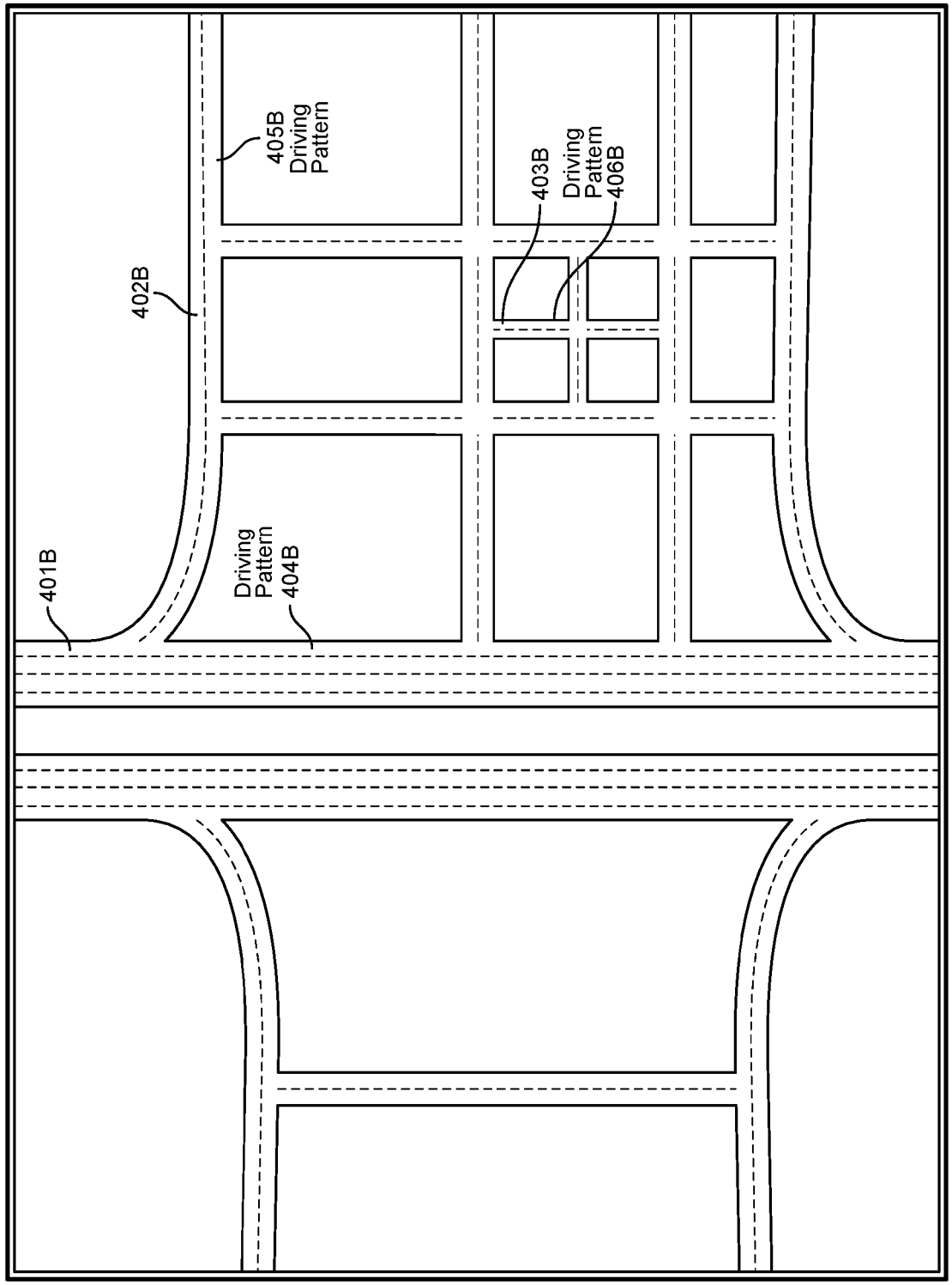

FIG. 4B illustrates an embodiment in which the type of road may be taken into consideration when identifying driving patterns. For example, transportation providers may drive on many types of roads including freeways, city streets, highways, suburban roads, one-way roads, bridges, toll roads, dirt roads, or different types of roads. In each situation, the transportation provider may drive somewhat differently. In FIG. 4B, for instance, the transportation may be associated with driving pattern 404B when driving on the freeway 401B. On the freeway, the transportation provider may tend to speed or weave in and out of traffic. Or, the transportation may be content to drive the speed limit while mostly staying in the same lane. These traits may be manifest in the driving pattern 404B, as the driving data is received from various sources including a computing device associated with the transportation, sensors of the vehicle associated with that computing device, sensors of a computing device associated with a transportation requestor, or sensors from a computing device that is part of or is electronically coupled to the main computing system of the vehicle. Similarly, driving pattern 405B may be associated with a highway road type 402B, and driving pattern 406B may be associated with an inner-city road type 403B. Other road types or road conditions may be noted in the driving patterns. These may help to distinguish the transportation provider from other providers, as the transportation provider may drive in a similar manner when driving on each of these different road types, or in certain locations, as shown in FIG. 4A.

Figure 4C:
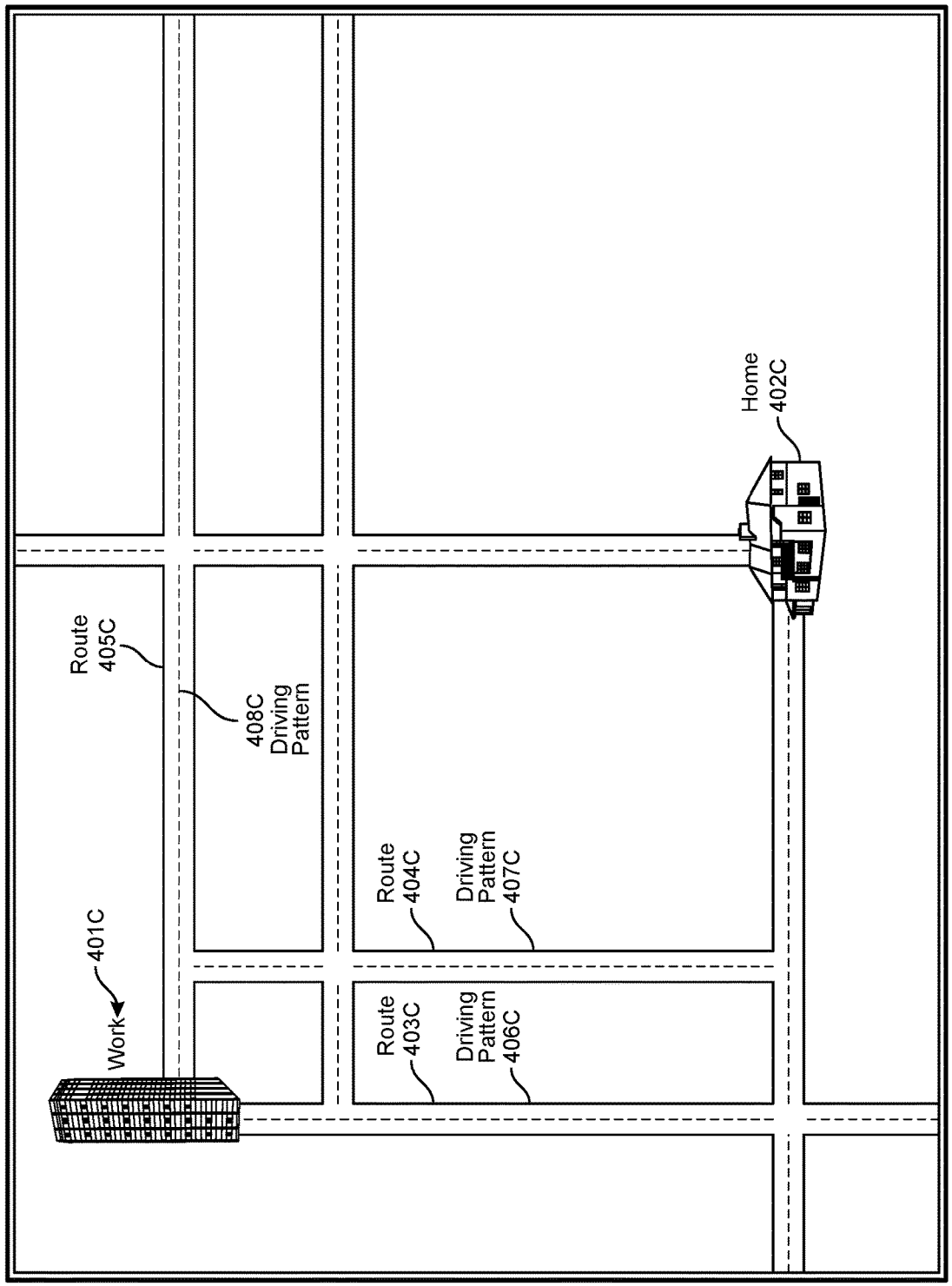

In like manner, different driving patterns may be identified for different routes. In some cases, the transportation provider may drive differently when on a certain route (e.g., a route with which the transportation provider is very familiar vs. a route that is unfamiliar to the provider). In FIG. 4C, the transportation provider may provide a ride to a particular transportation requestor on a regular basis, or may take riders to familiar establishments such as sports arenas, parks, malls, restaurants, airports, or places of work. In some cases, the actual route used to get to a particular location (e.g., a place of work for a transportation requestor) may be considered when identifying driving patterns. For instance, if a transportation provider is taking a transportation requestor from their home 402C to their place of work 401C, the provider may be more familiar with route 403C, which may result in driving pattern 406C. Route 404C may be less familiar to the transportation provider and, as such, may result in a different driving pattern 407C. Still further, route 405C may be the least familiar to the transportation provider and may result in driving pattern 408C. This variance in routes and corresponding driving patterns may hold true for different routes to the local airport, to gyms, restaurants, amusement parks, theaters, or other common destinations. The driving patterns may thus have a high level of granularity such that not only are general locations and road types considered in the driving patterns, but also the actual route used to get to those destinations in those locations on those roads.

Driving patterns may additionally or alternatively be identified based on the type of vehicle driven by the transportation provider. For instance, if the transportation provider has two vehicles, he or she may drive differently in each of those vehicles, especially if one is a large sport utility vehicle (SUV), while the other is a smaller sportier vehicle. Thus, vehicle type may be considered when identifying driving patterns associated with a transportation provider. Still further, different times of day, or different modes of transportation may also be considered. For instance, time windows between 6 am and 9 am or between 4 pm and 7 pm may indicate rush hour traffic, while time windows of 9 pm-12 am or 12 am-3 am may indicate lighter traffic, but may raise other concerns, such as drunk drivers on the road or fatigue in the transportation provider, both of which may be dangerous to transportation requestors. Different transportation modes including direct rides or shared rides or combined public/private rides in which the requestor uses some form of public transportation may also change how the transportation provider drives. Accordingly, time of day or specified time windows may reflect different types of driving which may be accounted for in the identified driving patterns, along with the selected mode of transportation.

Figure 4D:
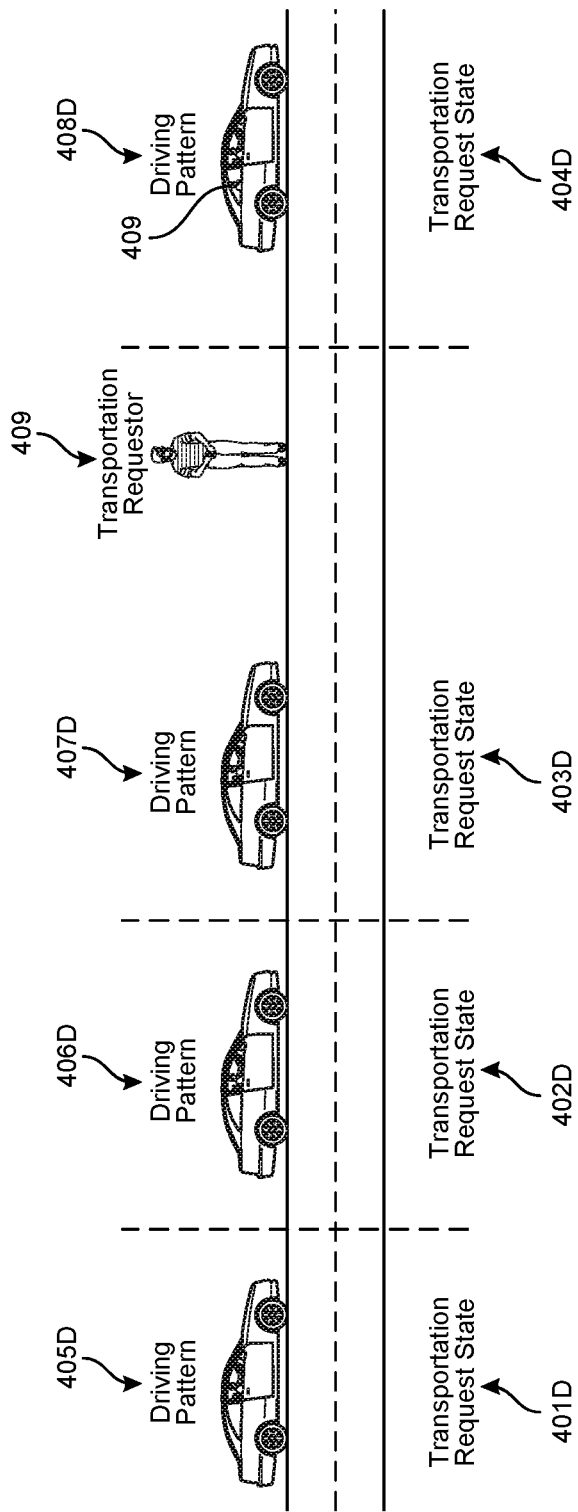

FIG. 4D illustrates an embodiment in which transportation request state is taken into consideration when identifying driving patterns. For example, in transportation request state 401D, the transportation provider may have driving pattern 405D. In transportation request state 401D, a computing device associated with the provider may not be initialized or the provider may not have turned on a transportation application that would match the provider to a transportation requestor and may drive in a certain manner noted in driving pattern 405D. In transportation request state 402D, the transportation provider may be associated with driving pattern 406D. In transportation request state 402D, the provider may have opened the transportation application that would match the provider to a transportation requestor, but provider's computing device may be unassigned to a transportation request (e.g., the provider may not have accepted any potential matches). In transportation request state 403D, the transportation provider may have been assigned to a transportation request (e.g., the provider may have accepted a transportation match) and may be en route to pick up the transportation requestor 409. In this transportation request state 403D, the driving pattern 407D may be associated with the transportation provider. And, in transportation request state 404D, in which the transportation provider has picked up the transportation requestor 409 and is driving to the specified destination, the driving pattern 408D may be associated with the provider.

In each of these respective transportation request states 401D-404D, the transportation provider may drive in a different manner. When alone (or at least without any transportation requestors), the provider may drive in one manner, and may drive differently when en route to pick up a requestor or when actually driving that requestor to a destination. Each of these transportation request states may be taken into consideration when determining a driving pattern. It should be understood here that each of the embodiments described in conjunction with FIGS. 4A-4D are examples, and that many other factors may be taken into consideration. Each of these factors, including geographic location, road type, route, vehicle type, time window, transportation mode, and transportation request state, may be used in isolation or in combination with each other when identifying driving patterns. Moreover, some of these factors may be weighted more heavily when identifying driving patterns, and some factors may be used more heavily with some users than with other users. Each factor or set of factors may be specifically chosen and selected for each user based on which provides the most differentiation in how the provider drives. This differentiation may be used to more accurately identify the provider, simply based on the way they drive.

Figure 5:
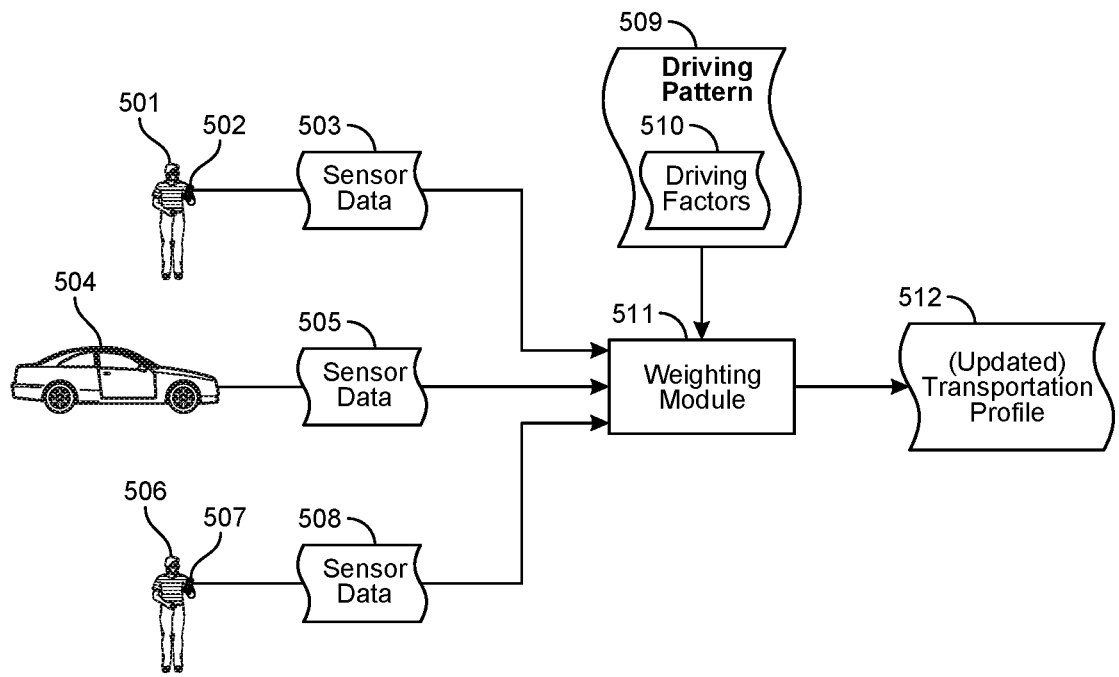
FIG. 5 illustrates an embodiment in which stored and current driving patterns are compared to identify a current provider state.

FIG. 5 illustrates an embodiment in which not only different driving factors 510 may be weighted differently, but also different sensor data. As noted in FIG. 3, many different types of sensor data may be collected and used to identify driving patterns (e.g., 509). When this sensor data is collected, whether from a computing device 502 associated with a transportation provider 501 (e.g., sensor data 503), or from a vehicle 504 (e.g., sensor data 505), or from a computing device 507 associated with a transportation requestor 506 (e.g., sensor data 508), that sensor data may be weighted by weighting module 511. The weighting module may be part of computer system 201 of FIG. 2, or may be part of a different computing system. The weighting module 511 may be configured to add or remove weight from certain sources of driving data. In some cases, sensor data 505 associated with the vehicle 504 may be more reliable or may be higher quality (e.g., less noise) or may have other properties that make the sensor data 505 a better indicator of the transportation provider's actual operation of the vehicle.

In some cases, the weighting module 511 may reduce the weight of sensor data 503 received from the computing device 502 associated with transportation provider 501. In some embodiments, the computing device 502 may be sitting on the passenger seat or in a glove box and may be free to move around within the vehicle. As such, acceleration measurements from the accelerometer, or gyroscopic measurements from the gyroscope may be less accurate than sensor data received from fixed-position sensors, such as those in the vehicle 504. In some cases, only some of the sensors from the computing device 502 may have a reduced (or increased) weighting. For example, the microphone 307, the GPS radio 308, the barometer 309, and potentially other sensors may work the same whether the computing device is moving within the vehicle or not. Other sensors may be impeded and may receive a poorer connection, for instance, if the computing device is placed in a certain position (e.g., under a seat). As such, the weighting module 511 of FIG. 5 may weight each piece of sensor data received from each sensor differently, and may weight groups of sensors differently as well (e.g., adding weight to sensor data 505 received from vehicle 504 or reducing weight from some or all of the sensor data 508 received from the computing device 507 associated with transportation requestor 506).

The weighting module may make initial weightings according to a policy or according to user preference, or according to preprogrammed instructions. In some cases, the weighting may be updated dynamically to weight the sensor data differently based on various factors. For instance, the computer system 201 of FIG. 2 may determine that some sensor data sources are better indicators of distinguishable driving patterns. This may lead to an improved ability to verify the authenticity of transportation providers based on the way they drive the vehicle. The computer system 201 may identify those sensor data sources that are better at providing distinguishable driving patterns, and may instruct the weighting module 511 to add an increased weight to those sensor data sources (while potentially also adding a decreased weight to other sensor data sources). Still further, as time progresses, some data sources may become obscured (e.g., through rain or snow, or because the sensor was covered by something, or because the radio volume was increased too loudly, or because the user entered a tunnel and lost GPS reception, etc.). Many factors may cause a sensor data source to lose its dependability or its ability to provide accurate information. As such, the weighting module 511 may be configured to dynamically reduce the weighting of those sources on the fly and potentially increase the weighting of other sensor data sources.

Similarly, as noted above, the various driving factors 510 that may each have their own effect the transportation provider's driving pattern 509 (e.g., geographic location, road type, route, vehicle type, time window, transportation mode, transportation request state, or other factors). These factors may also be weighted with an increased or a decreased weight, in addition to any weightings applied to the sensor data sources. For some transportation providers, geographic location or type of vehicle may be better indicators of distinguishable driving patterns that help distinguish that provider from other providers. For other transportation providers, the way they drive a given route, or their selection of a given route, or the way they drive in a given transportation request state may provide better indicators of their identity. As such, the weighting module 511 may again dynamically adjust the weightings for any or all of the driving factors 510 to produce an updated transportation profile 512 that is more accurate and is better at distinguishing that provider from other providers.

Still further, the weighting module 511 may be configured to apply different weightings in different circumstances. For example, when the computing device associated with transportation provider 601 has previously been subjected to increased scrutiny within the transportation management system, weightings may be increased, for example, to driving time spent in the transportation request state in which the transportation provider has the transportation requestor in the vehicle and is en route to the destination. Driving data from this time period may be of increasing importance because a requestor is in the vehicle and the transportation provider should be operating the vehicle in an optimal fashion. In other cases, the weighting module 511 may increase or decrease the weighting of certain sensor data sources when the vehicle 504 or the transportation provider's computing device 502 is in a specified location or is on a specified route.

In still other cases, the weighting module 511 may increase or decrease the weighting of certain sensor data sources when ride-history data (e.g., 222 of FIG. 2) dictates an alternative weighting. For example, ride-history data may indicate that the transportation has had issues driving safely in the snow, or at night, or on the freeway, or in other circumstances. As such, a heightened awareness of this ride-history data may lead the weighting module 511 to apply increased weight to certain types of sensor data and/or driving factors in those types of conditions. Additional weighting may also be added or removed when an event occurs near a current location of the transportation provider's computing device 502. For instance, if a car accident occurs near the current position of the transportation provider's computing device 502, the weighting module may give increased weight to speed sensor data or route factors, or may decrease certain weightings as the provider may instinctively drive more slowly or cautiously in the presence of another car accident. Accordingly, the weighting module 511 may dynamically assign or reassign weightings to certain sensor data sources and/or driving factors based on current or past circumstances or conditions.

Figure 6:
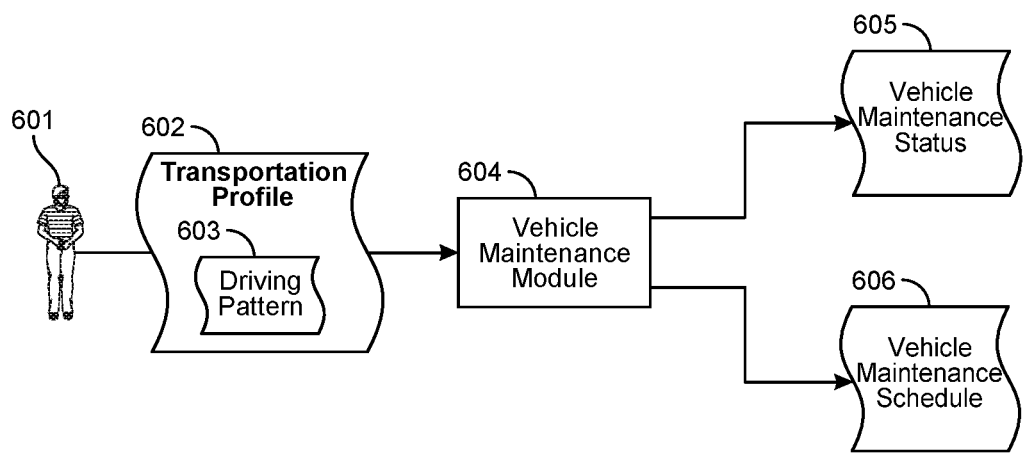
FIG. 6 illustrates an embodiment in which sensor data is weighted based on different weighting factors.

FIG. 6 illustrates an embodiment in which a transportation provider's driving patterns may be used to generate a vehicle maintenance status and/or a vehicle maintenance schedule. For example, transportation provider 601 may have an associated transportation profile 602. The transportation profile 602 may be generated based on driving patterns 603 identified from driving data. The vehicle maintenance module 604 may be configured to access the transportation profile 602 associated with a computing device of the transportation provider and may determine, based on the driving patterns 603, a current maintenance status of a vehicle associated with that computing device. The driving patterns 603 may identify, as noted above, how the transportation provider drives a certain vehicle. This may include indications of whether the transportation provider 601 is apt to drive quickly, slam on their brakes, corner hard, weave between traffic, or perform other maneuvers that may increase wear and tear on the vehicle. In contrast, other transportation providers may be apt to drive slower, corner softly, accelerate less quickly, and apply the brakes in a smooth, linear manner. As such, the driving patterns 603 may indicate a vastly different amount of wear depending on how the transportation provider drives the vehicle.

Thus, using this determined amount of wear on the vehicle, the vehicle maintenance module 604 may generate a vehicle maintenance status 605 indicating when particular maintenance actions have been performed, and which maintenance actions likely need to be performed based on the driving patterns 603. For instance, the vehicle maintenance status 605 may indicate that although brake pads were recently replaced, because the transportation provider comes to sudden stops so often, the brake pads will need to be replaced within 3-4 weeks. Many other examples including an indication that the motor oil needs to be changed, the transmission oil needs to be changed, the transmission fluid needs to be changed, the timing belt needs to be changed, spark plugs, rotors, coolant, and other parts may all be monitored and noted in the vehicle maintenance status 605. Using the determined maintenance status of the vehicle, the vehicle maintenance module 604 may then generate a customized maintenance schedule 606 for the vehicle. This maintenance schedule 606 may take into account how the transportation provider 601 drives based on the driving data and the driving patterns 603 and may indicate when various items are to be checked and/or replaced. This maintenance schedule 606 may be dynamically changed (e.g., while the transportation provider is driving, or after the provider has completed a shift) based on newly received driving data and newly identified driving patterns 603. Thus, the maintenance schedule 606 may be continually updated as new information is received.

Figure 7:
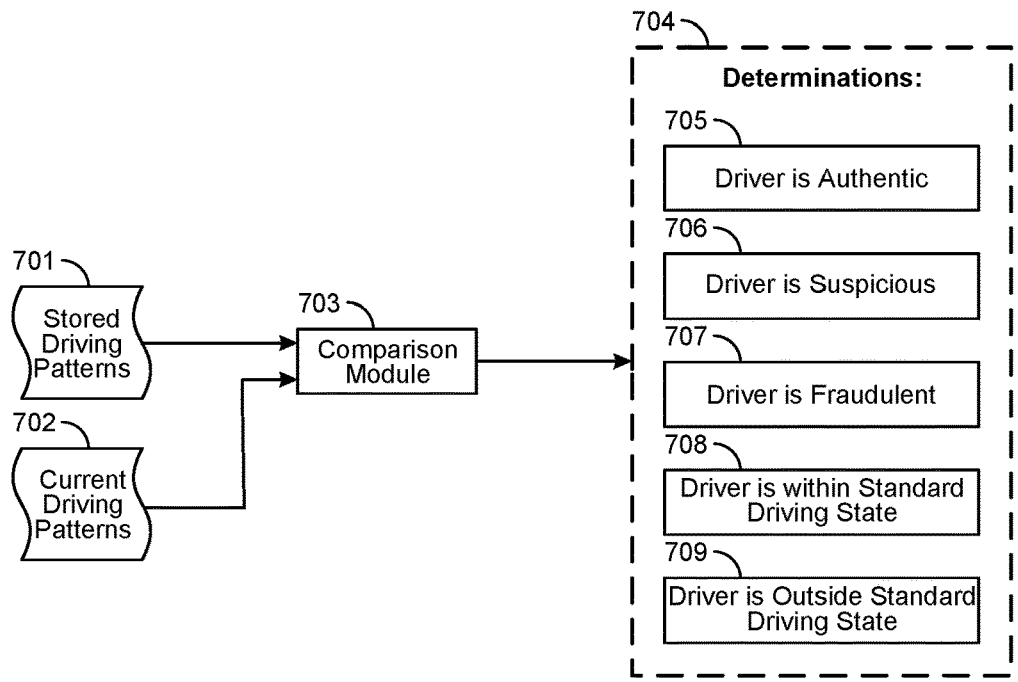
FIG. 7 illustrates an embodiment in which a vehicle maintenance status and/or vehicle maintenance schedule are generated.

FIG. 7 illustrates an embodiment in which the transportation profile (e.g., 215 of FIG. 2) may be applied within the transportation management system. Applying the transportation profile within the transportation management system may include a wide variety of transportation management actions including storing the driving data and/or the transportation profiles in a data store. Other transportation management actions may include implementing the transportation profile to identify a transportation provider or verify the authenticity of a transportation provider. In one example, the comparison module 703 may access stored driving patterns 701 along with one or more current driving patterns 702. The stored driving patterns 701 may be associated with a computing device that is associated with a transportation provider. As described above, the driving patterns 701 may indicate how the transportation provider operates their vehicle in general and in specific circumstances. These driving patterns may be identified and used to determine who is driving a given vehicle, potentially without any other information other than the driving data received from the various sensors described in FIG. 3. The comparison module 703 of FIG. 7 may access these stored driving patterns 701 and compare them to current driving patterns 702 generated from recently received driving data (e.g., data received within the last 10 minutes, the last 30 minutes, the last hour, the last eight hours, or within some other specified time frame).

By associating a stored driving pattern 701 with a known transportation provider, any deviations from that stored driving pattern 701 may be identified by the comparison module 703. In some cases, these deviations may be minor, while in other cases, the deviations may be significant. The deviations between the stored driving patterns 701 for a given transportation provider and the current driving patterns 702 for the same (or purportedly the same) transportation provider may indicate a wide variety of different clues as to whether the transportation provider is who they say they are. In some cases, if the deviations between the stored driving patterns 701 and the current driving patterns 702 are slight, the comparison module 703 may determine that the transportation provider is authentic. If the deviations between 701 and 702 are more significant, the comparison module 703 may make a variety of different determinations 704 including that the transportation provider is suspicious 706, that the transportation provider is fraudulent 707, that the transportation provider is within a standard driving mental or physical state 708, or that the transportation provider is outside of a standard driving mental or physical state 709. In some cases, if determinations 706, 707, or 709 are made by the comparison module 703, the computer system 201 of FIG. 2 may send a transportation notification to a computing device associated with the transportation provider. That transportation notification may simply notify the transportation provider that suspicious behavior has been identified, or the notification may include a verification challenge (e.g., 218).

Sending such a transportation notification may indicate to the transportation provider that the transportation management system has become aware that the provider is not who they say they are, or is driving while fatigued or intoxicated, is driving in a reckless manner, or is otherwise driving in a manner that may cause concern for the safety of that provider's passengers. If the transportation provider's driving is vastly different than normal (e.g., the delta between their stored driving patterns 701 and their current driving patterns 702), that provider may be flagged as suspicious 706. The comparison module 703 may look at current conditions including weather, location, road type, route, transportation request state, or any of the other factors used to identify the provider's driving patterns. The comparison module 703 may also look at the weightings provided by the weighting module 511 of FIG. 5 that may have increased or decreased the weighting of certain sensor data (e.g., 503, 505, or 508) or certain driving factors (e.g., 510). Any or all of these sensor data sources or driving factors may play a role in determining the current driving patterns 702 and in determining whether the variations in driving patterns is sufficient to merit sending a notification to the computing device associated with the transportation provider.

In some cases, for example, the current transportation provider may be driving much faster than normal, or may rev the engine much more than normal, or may apply the brakes more softly than normal, or may take different routes than normal, or may squeal the tires, or fail to stop fully at stop signs, or perform other driving maneuvers that are uncharacteristic of the transportation provider (as indicated by the stored driving patterns 701). In such cases, the comparison module 703 may determine that the current operator of the vehicle is very likely not the known, authentic transportation provider associated with the stored driving patterns 701. In such cases, the comparison module 703 may determine that the current transportation provider is fraudulent 707 and may send a notification with a verification challenge.

In other cases, the transportation provider's driving may not stray so far from the stored driving patterns 701 as to indicate that a different person is driving the vehicle, but may indicate that the provider is operating outside of a standard driving mental or physical state 709. The stored driving patterns 701 may indicate the provider's standard, lucid driving state, in a variety of different conditions, road types, transportation request states, etc. These may establish a standard driving mental or physical state 708 for that provider. If the provider is tired, intoxicated, on drugs (prescribed or otherwise), distracted, or otherwise driving abnormally (but still within the threshold delta limit that would indicate that another person is driving) the comparison module 703 may determine that the driving is driving outside their standard physical or mental driving state 709, and may cause the computer system 201 to issue a notification indicating that the provider should consider ending their shift and not providing rides to any additional transportation requestors.

Thus, the comparison module 703 may detect deviations between the stored driving patterns 701 (and/or stored driving data 222) and current driving patterns 702 (and/or current driving data 211). The current driving patterns or driving data may be compared with a transportation profile which itself may include the stored driving patterns and driving data. Regardless of which determination 704 is made, the application module 216 of FIG. 2 may perform some type of action 217 including simply storing a record indicating the determined differences between the stored and current data or sending a notification to the computing device 225 associated with the transportation provider 208, or sending a notification to the vehicle itself 209, or sending a notification to the computing device 226 associated with the transportation requestor 210. Taking this action 217 may occur while the computing device 225 or 226 is logged in to a transportation application hosted by that computing device. As such, the notification may appear within the transportation application and the transportation provider or the transportation requestor may respond to the notification. In other cases, the notification may be sent as a text message, an email message, an alert message, or a notification to some other application.

Figure 8:
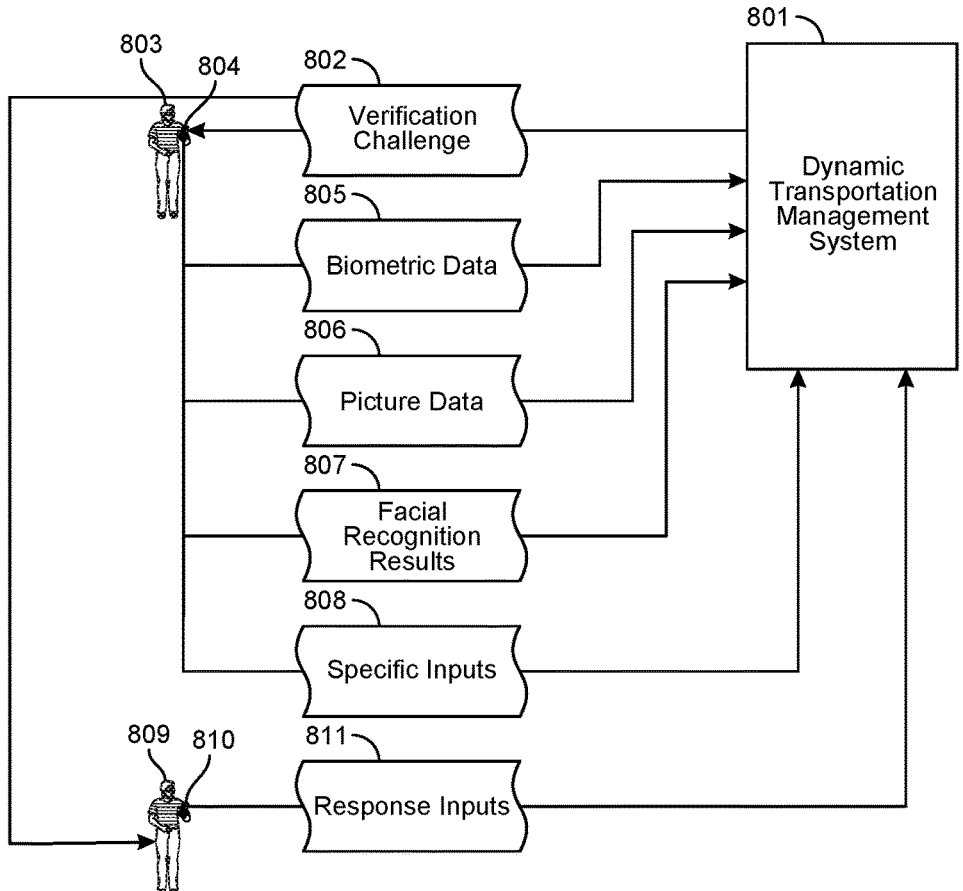
FIG. 8 illustrates an embodiment in which a vehicle transportation provider may be notified and may respond to the notification.

FIG. 8 illustrates an embodiment in which the transportation management system 801 (which may be the same as or different than dynamic transportation management system 200 of FIG. 2) may issue a verification challenge 802. This verification challenge 802 may be sent to a computing device 804 associated with the transportation provider 803 and/or associated with a specific vehicle driven by the transportation provider. Additionally or alternatively, the verification challenge 802 may be sent to a computing device 810 associated with a transportation requestor 809 or other entity associated with a transportation request. The verification challenge 802 may be sent as a notification in response to determining that the provider's current driving patterns are substantially different than the stored driving patterns for that provider. The verification challenge 802 may ask the transportation provider 803 to provide some type of proof of their identity. For instance, the verification challenge 802 or other type of transportation notification may include a request for biometric data 805, a request for a picture (e.g., picture data 806) or live video feed of the provider 803, a request for a picture (or other proof) of a driver's license, a request to conduct an interview with a live operator (over the phone or over video) associated with the transportation management system 801, a request to provide inputs 808 into a transportation application (e.g., a passcode, password, answer to a security question, or other set of inputs that would only be known by the rightful transportation provider).

Upon being queried for such information, either via text, via email, via an operating system notification, via a transportation application, or via some other option, the transportation provider 803 may provide the requested information using their computing device 804. For instance, if biometric data 805 is requested in the verification challenge 802, the transportation provider 803 may provide a voice sample, a fingerprint (via a tethered fingerprint reader), an iris scan (via a tethered iris scanner), or other types of biometric data. For instance, in some cases, the verification challenge 802 may request that the transportation provider initiate and utilize a facial recognition application on the computing device 804. The facial recognition application may be configured to perform a live scan of the provider's face and provide the facial recognition results 807 to the transportation management system 801. The facial recognition application may take still images of the provider's face, or may take a live video feed. The facial recognition application may be configured to analyze points on the provider's face and compare them to a known valid sample of the provider's face. If the two match, then the facial recognition results 807 may indicate that the provider is authentic, and if the two do not match, then the facial recognition results 807 may indicate that the provider is fraudulent.

In some embodiments, the verification challenge 802 may be sent to other entities in place of or in addition to the transportation provider 803. For instance, in some cases, the verification challenge 802 may be sent only to a transportation requestor 809 and not to the transportation provider (e.g., in cases where provider fatigue or intoxication are suspected). In other cases, the verification challenge 802 may be sent only to the transportation provider 803, or may be sent to both the provider 803 and the transportation requestor 809 and/or to any computing device that may be associated with a given transportation request. In one embodiment, in which provider fatigue is suspected, the transportation management system 801 may send a verification challenge 802 to the transportation requestor 809, asking the transportation requestor if they suspect the provider of being fatigued or intoxicated. Or, the verification challenge 802 may ask the transportation requestor if they feel safe or unsafe and, if unsafe, what the potential cause may be. The transportation requestor's responses 811 may be provided to the transportation management system 801 where other systems or entities may determine how to respond.

In some cases, a response to an indication from the transportation requestor stating that they feel unsafe or stating their concern that the transportation provider may be fatigued, distracted, intoxicated, or otherwise in a poor physical or mental state, the transportation management system 801 may send a verification challenge 802 to the transportation provider 803, asking the provider to provide biometric data 805, picture data 806, facial recognition results 807, or other inputs 808 to ensure that the provider is who they say they are and to ensure that they are in a proper physical/mental state. If the transportation provider 803 provides reasonable inputs to the verification challenge 802, indicating perhaps that weather or other external factors caused the change in driving patterns, the transportation management system 801 may make a record of the event and move on. If unsatisfactory inputs are provided, then the provider may be indicated as unverified and more severe measures may be taken. In this manner, verification challenges may be implemented to ensure that requestors are being safely transported by known individuals that are determined to be in an appropriate mental and physical state when driving.

In some cases, the response inputs 811 from the transportation requestor 809 or other entities associated with a given request for transportation may be used to supplement any responses provided by the transportation provider 803. For instance, the transportation provider 803 may provide biometric data 805, picture data 806, or some other type of data in response to a verification challenge 802. The transportation requestor 809 or other specified entities may also provide response inputs 811. In cases where the transportation provider's inputs lead the transportation management system 801 to determine that the provider 803 is authentic and is driving in a proper, standard mental/physical state, the requestor's inputs 811 may be used to corroborate that determination. If, however, the transportation provider's inputs lead the transportation management system 801 to determine that the provider is fraudulent, the requestor's response inputs 811 may influence the transportation management system to consider that the determination may be faulty, or may indicate that the determination was proper. Thus, the transportation requestor's inputs 811 may supplement those of the transportation provider 803 and may be used as a backstop for verification and as a tool to remove false positive determinations of fraud or improper mental/physical state.

Still further, while the transportation provider 803 may be verified as authentic or fraudulent based on inputs received from the transportation provider 803 or from other entities associated with a transportation request (e.g., transportation requestor 809), the transportation provider may also be verified supplementarily by other sources of information. For instance, in some embodiments, the verification of the transportation provider 803 may be supplemented by vehicle sensor data, computing device sensor data, or data received from the computing device associated with the transportation request. As shown in FIG. 8, the dynamic transportation management system 801 may send a verification challenge 802 to a computing device 804 associated with the transportation provider 803. The transportation provider 803 may provide responses to the verification challenge 802, including sending biometric data 805, picture data 806, etc. In some cases, the dynamic transportation management system 801 may additionally implement vehicle sensor data (e.g., from vehicle 311 of FIG. 3) to corroborate the verification challenge response data sent by computing device 804 associated with the transportation provider 803. Additionally or alternatively, the dynamic transportation management system 801 may implement response inputs 811 and/or sensor data from one or more of the sensors on the computing device 810 associated with transportation requestor 809. Thus, the transportation provider 803 may be verified, at least partially, based on challenge response data (e.g., 805-808), sensor data from computing device 804, sensor data from computing device 810, vehicle sensor data, or sensor or driving data from other computing devices associated with a given transportation request.

In some embodiments, verifying the transportation provider 803 may include verifying the authenticity of the transportation provider. In other cases, this verification may additionally or alternatively include verifying a current state of the transportation provider. Verifying the authenticity of a transportation provider may include determining that the transportation provider is who they purport to be. Each provider within the dynamic transportation management system 801 may have an associated bibliographic profile with information that may be used to identify the provider including name, address, phone number, email address, physical characteristics, or other information. The generated transportation profile 215 (of FIG. 2) may be associated with or may be part of this bibliographic profile. This combined profile may represent the identity of the provider 803. If another person attempts to use the provider's account within the dynamic transportation management system 801, or attempts to drive in place of the provider 803, or otherwise attempts to use their identity, that person may be said to be inauthentic or fraudulent. Thus, the dynamic transportation management system 801 may attempt to determine, based on differences in driving patterns, whether a provider is authentic. If the determined deviations between current driving patterns and stored driving patterns are beyond a specified threshold amount, the dynamic transportation management system 801 may issue a notification that may include a verification challenge. This verification challenge 802 may attempt to determine whether the provider is inauthentic, or is merely in an undesirable mental or physical state that would render them unfit to safely provide rides for requestors.

If the transportation provider 803 (or the computing device 804 associated with the transportation provider) has failed a verification challenge, the dynamic transportation management system 801 may perform various disciplinary actions in connection with the transportation provider 803. For instance, the transportation provider may be notified that they are now on probation, or that they are suspended from giving rides, or that they have been removed from the system and are no longer eligible to provide rides for the dynamic transportation management system 801. Other disciplinary actions are also possible. In cases where the transportation provider 803 passes a verification challenge 802, the dynamic transportation management system 801 may request a response from the computing device 804 associated with the transportation provider 803 asking about any noted deviations between a current driving pattern and older driving patterns. If the transportation provider provides satisfactory answers explaining the deviations, the dynamic transportation management system 801 may make a note of the situation and, at least in some cases, no further action may take place.

Figure 9:
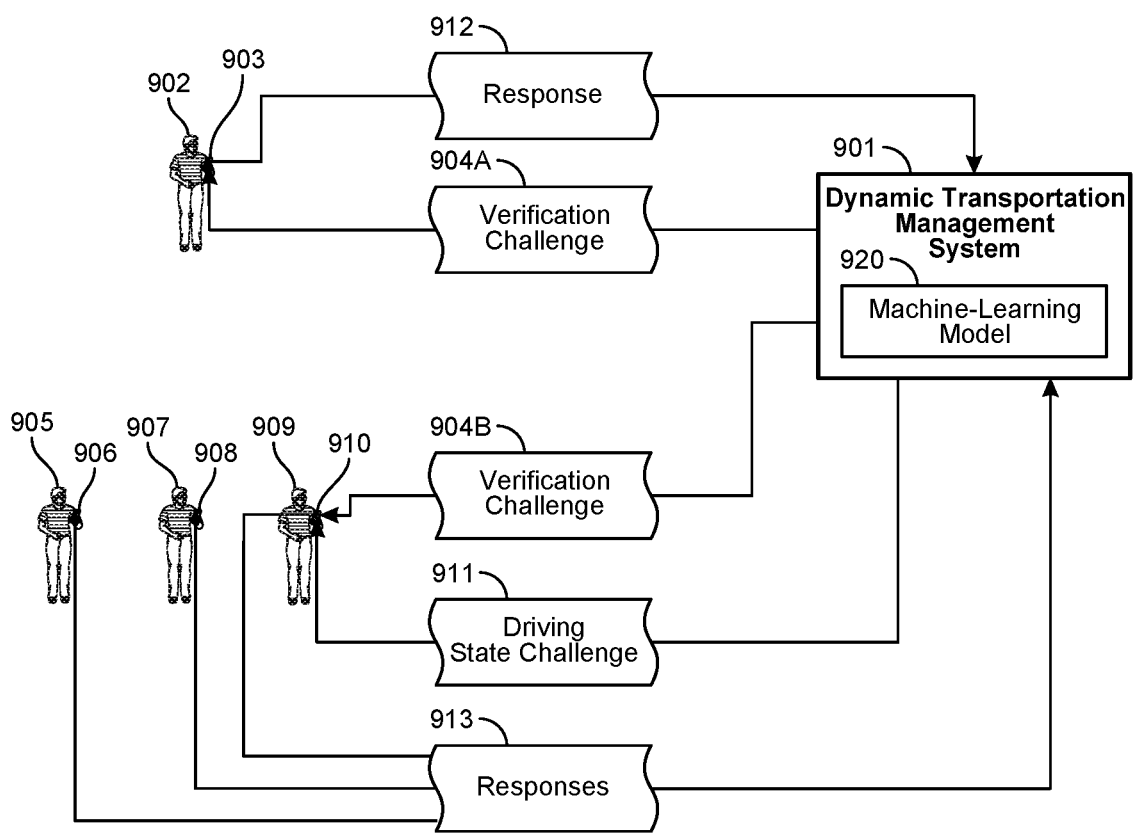
FIG. 9 illustrates an embodiment in which a machine learning model may implement a feedback loop to identify fraudulent transportation providers.

In order to avoid sending verification challenges unnecessarily, and in order to avoid making determinations of fraudulence as opposed to mere fatigue or internal distractions within the vehicle, the dynamic transportation management system 901 of FIG. 9 may implement a machine-learning model 920 to learn from false positive determinations and to reinforce accurate notions of fraudulence by identifying and storing details related to true positive determinations. For example, the dynamic transportation management system 901 may send a verification challenge 904A to a computing device 903 associated with a transportation provider 902. The verification challenge 904A may be similar to or the same as verification challenge 802 of FIG. 8. The verification challenge 904A may ask the transportation provider to provide certain response data 912 including providing biometric data, facial recognition data, etc. The machine-learning (ML) model 920 may be configured to determine a gradient between the responses provided by the transportation provider 902 and the responses expected by the ML model 920.

If the response data 912 provided by the transportation provider 902 are within the gradient (i.e., within an expected range), then the transportation provider 902 may be deemed to have passed the verification challenge, and the ML model 920 may make a note of a false positive. On the other hand, if the response data 912 provided by the transportation provider 902 are not within the gradient, then the transportation provider 902 may be deemed to have failed the verification challenge 904A, indicating that transmission of the challenge was proper and that the determination was a true positive. In this manner, the ML model may detect deviations between the response data 912 and expected response data, and may also be automatically updated based on the false positive or true positive determinations.

In some cases, the dynamic transportation management system 901 may also send verification challenges (e.g., 904B) to other entities associated with a transportation request including transportation requestors 905, 907, and 909. The dynamic transportation management system 901 may be configured to transmit verification challenge 904B to the computing devices 906, 908, and/or 910 of the various transportation requestors. In some cases, the verification challenge 904B may challenge the transportation provider's authenticity and challenge the provider's current driving mental or physical state.

In other cases, a separate driving state challenge 911 that attempts to verify the transportation provider's current physical or mental state may be sent to one or more of the transportation requestors 905, 907, or 909. These transportation requestors may provide their responses 913 to the authenticity and/or driving state challenges to the dynamic transportation management system 901. The ML model 920 may then analyze the responses 913 against the response data 912 of the transportation provider, or may analyze the responses 913 in isolation. The results of the analysis may be used to reinforce a false positive determination or a false negative determination. Thus, in this manner, the ML model 920 may continually receive inputs from transportation providers and transportation requestors and update the ML model based on which inputs led to false positive determinations and which inputs led to false negative determinations.

Figure 10:
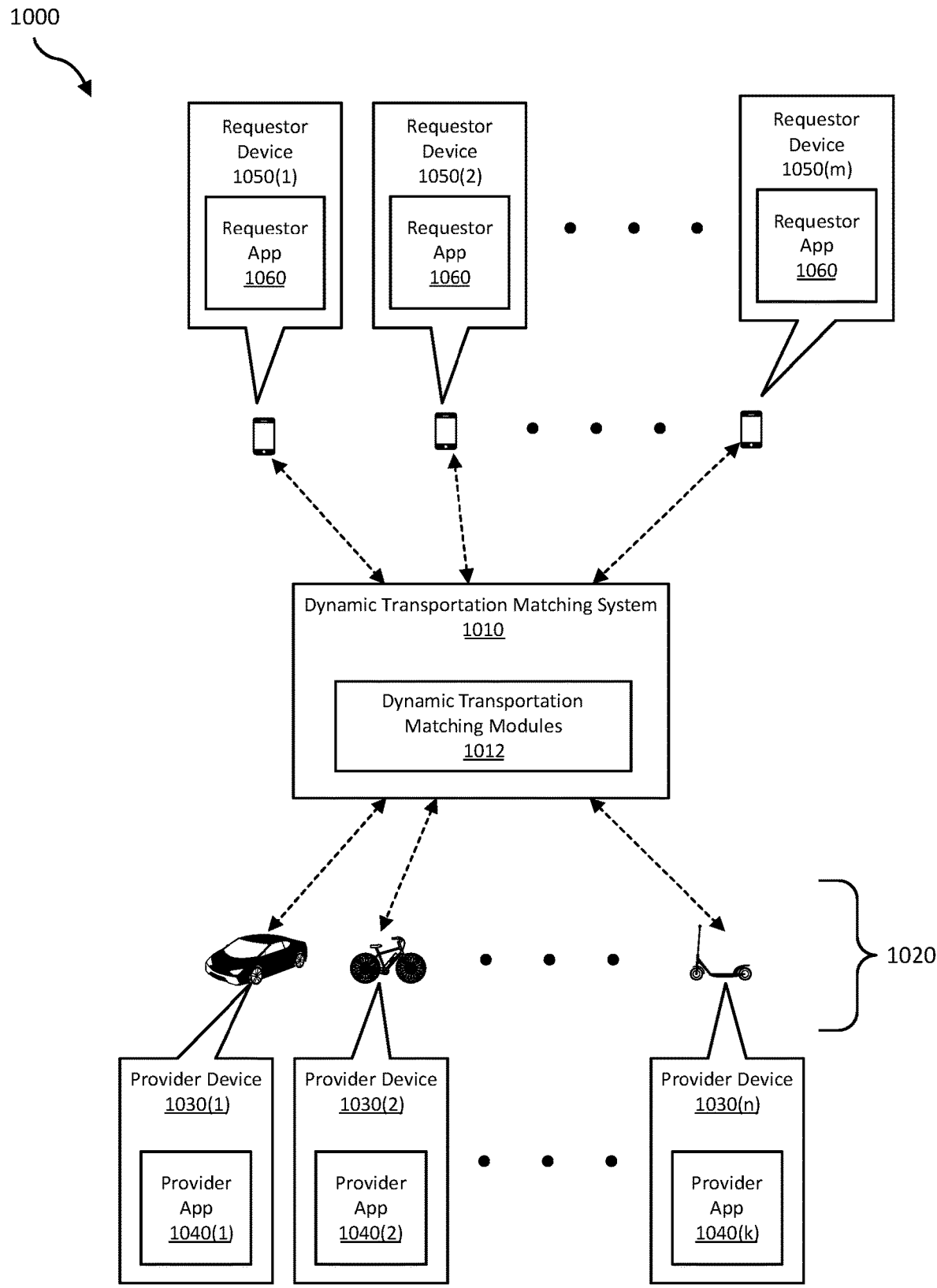
FIG. 10 is a block diagram of an example dynamic transportation management system.

FIG. 10 illustrates an example system 1000 for matching transportation requests with a dynamic transportation network that includes MMVs. As shown in FIG. 10, a dynamic transportation matching system 1010 may be configured with one or more dynamic transportation matching modules 1012 that may perform one or more of the steps described herein. Dynamic transportation matching system 1010 may represent any computing system and/or set of computing systems capable of matching transportation requests. Dynamic transportation matching system 1010 may be in communication with computing devices in each of a group of vehicles 1020. Vehicles 1020 may represent any vehicles that may fulfill transportation requests. In some examples, vehicles 1020 may include disparate vehicle types and/or models. For example, vehicles 1020 may include lane-bound vehicles and MMVs. In some examples, some of vehicles 1020 may be standard commercially available vehicles.

According to some examples, some of vehicles 1020 may be owned by separate individuals (e.g., transportation providers). Furthermore, while, in some examples, many or all of vehicles 1020 may be human-operated, in some examples many of vehicles 1020 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 10 does not specify the number of vehicles 1020, it may be readily appreciated that the systems described herein are applicable to hundreds of vehicles, thousands of vehicles, or more. In one example, dynamic transportation matching system 1010 may coordinate transportation matchings within a single region for 50,000 vehicles or more on a given day. In some examples, vehicles 1020 may collectively form a dynamic transportation network that may provide transportation supply on an on-demand basis to transportation requestors.

As mentioned above, dynamic transportation matching system 1010 may communicate with computing devices in each of vehicles 1020. The computing devices may be any suitable type of computing device. In some examples, one or more of the computing devices may be integrated into the respective vehicles 1020. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a provider-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 1010.

As shown in FIG. 10, vehicles 1020 may include provider devices 1030(1)-(*n*) (e.g., whether integrated into the vehicle, permanently affixed to the vehicle, temporarily affixed to the vehicle, worn by a provider associated with the vehicle, etc.). In some examples, provider devices 1030 may include provider apps 1040(1)-(*k*). Provider apps 1040(1)-(*k*) may represent any application, program, and/or module that may provide one or more services related to operating a vehicle and/or providing transportation matching services. For example, provider apps 1040(1)-(*k*) may include a transportation matching application for providers and/or one or more applications for matching MMVs with requestor devices. In some embodiments, different types of provider vehicles may be provisioned with different types of provider devices and/or different provider applications. For example, MMVs may be provisioned with provider devices that are configured with a provider application that enables transportation requestors to reserve and/or operate the MMVs while road-constrained and/or lane-bound vehicles (e.g., cars) may be provisioned with provider devices that are configured with a provider application that enables provider vehicle operators (e.g., transportation providers) to respond to requests from transportation requestors. In some examples, provider applications 1040(1)-(*k*) may match the user of provider apps 1040(1)-(*k*) (e.g., a transportation provider) with transportation requestors through communication with dynamic transportation matching system 1010. In addition, and as is described in greater detail below, provider apps 1040(1)-(*k*) may provide dynamic transportation management system 1010 with information about a provider (including, e.g., the current location of the provider and/or vehicle) to enable dynamic transportation management system 1010 to provide dynamic transportation matching and/or management services for the provider and one or more requestors. In some examples, provider apps 1040(1)-(*k*) may coordinate communications and/or a payment between a requestor and a provider. According to some embodiments, provider apps 1040(1)-(*k*) may provide a map service, a navigation service, a traffic notification service, and/or a geolocation service.

Additionally, as shown in FIG. 10, dynamic transportation matching system 1010 may communicate with requestor devices 1050(1)-(*m*). In some examples, requestor devices 1050 may include a requestor app 1060. Requestor app 1060 may represent any application, program, and/or module that may provide one or more services related to requesting transportation matching services. For example, requestor app 1060 may include a transportation matching application for requestors. In some examples, requestor app 1060 may match the user of requestor app 1060 (e.g., a transportation requestor) with transportation providers through communication with dynamic transportation matching system 1010. In addition, and as is described in greater detail below, requestor app 1060 may provide dynamic transportation management system 1010 with information about a requestor (including, e.g., the current location of the requestor) to enable dynamic transportation management system 1010 to provide dynamic transportation matching services for the requestor and one or more providers. In some examples, requestor app 1060 may coordinate communications and/or a payment between a requestor and a provider. According to some embodiments, requestor app 1060 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, a micro-mobility service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 11:
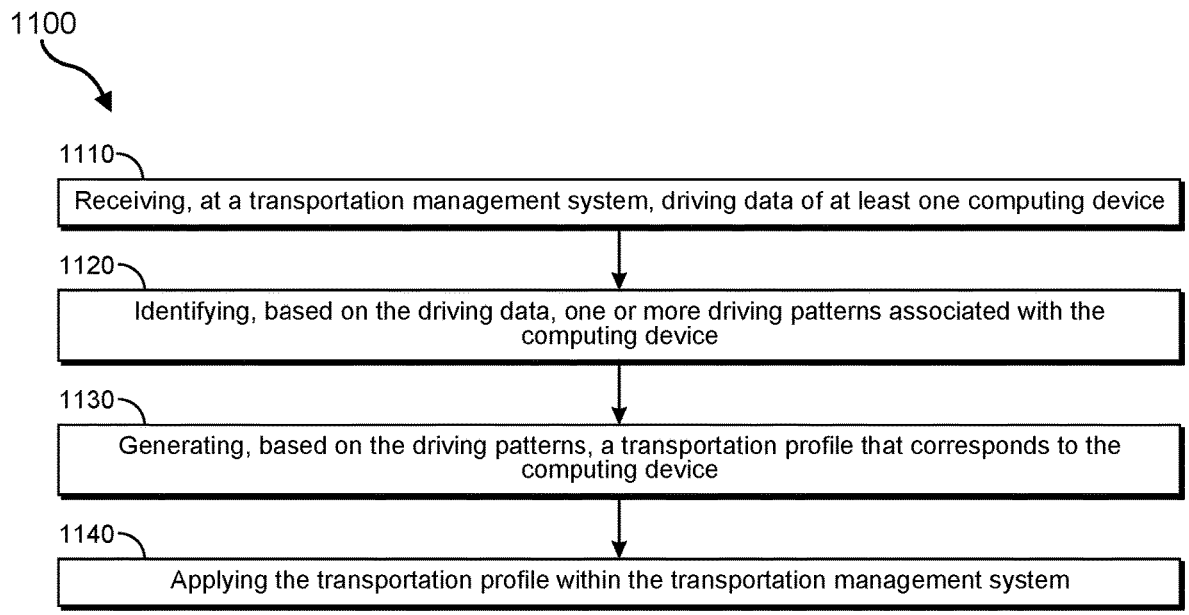
FIG. 11 is a flow diagram of an example method for generating and applying a transportation profile.

FIG. 11 is a flow diagram of an exemplary computer-implemented method 1100 for creating and verifying a transportation profile. The steps shown in FIG. 11 may be performed by any suitable computer-executable code and/or computing system, including the systems illustrated in FIGS. 2-9. In one example, each of the steps shown in FIG. 11 may represent an algorithm whose structure includes and/or is represented by multiple sub-steps, examples of which will be provided in greater detail below.

As illustrated in FIG. 11, at step 1110, one or more of the systems described herein may include receiving, at a transportation management system, driving data associated with at least one computing device. The method may next include, at step 1120, identifying, based on the driving data, one or more driving patterns associated with the computing device. The method may also include generating, at step 1130, based on the driving patterns, a transportation profile that corresponds to the computing device and, at step 1140, applying the transportation profile within the transportation management system.

In some examples, the received driving data may include sensor data obtained from at least one of: one or more sensors of the computing device, one or more sensors of a vehicle associated with the computing device, one or more sensors of an additional computing device, or one or more sensors of a computing device associated with a transportation request.

In some embodiments, the received driving data may include telemetry data of a vehicle associated with the computing device, location data associated with the computing device, or ride-history data associated with the computing device. In some case, at least one of the identified driving patterns may be associated with a geographic location, a road type, a route, a vehicle type, a time window, a transportation mode, or a transportation request state.

In some examples, the transportation request state may include a first transportation request state wherein the computing device is uninitialized, a second transportation request state wherein the computing device is unassigned to a transportation request, a third transportation request state wherein the computing device is assigned to the transportation request, or a fourth transportation request state wherein the computing device is en route to a destination associated with the transportation request.

In some cases, in the fourth transportation request state, at least one computing device associated with the transportation request is also en route to the destination. In some examples, driving data received from one data source may be weighted differently from driving data received from at least one other data source when identifying the one or more driving patterns.

In some embodiments, portions of the received driving data may be weighted differently when the computing device has previously been subjected to increased scrutiny within the transportation management system, when the computing device is in a specific transportation request state, when the computing device is in a specified location, when ride-history data dictates an alternative weighting, or when an event has occurred near a current location of the computing device.

In some examples, the method may further include accessing the transportation profile associated with the computing device and determining, based on the driving patterns identified in the transportation profile, a maintenance status of a vehicle associated with the computing device. In some cases, the method may further include generating, based on the determined maintenance status of the vehicle, a customized maintenance schedule for the vehicle. In some embodiments, applying the transportation profile within the transportation management system may include performing a transportation management action based on the transportation profile. In some examples, the transportation management action is performed while the computing device is logged in to a transportation application hosted by the computing device.

Figure 12:
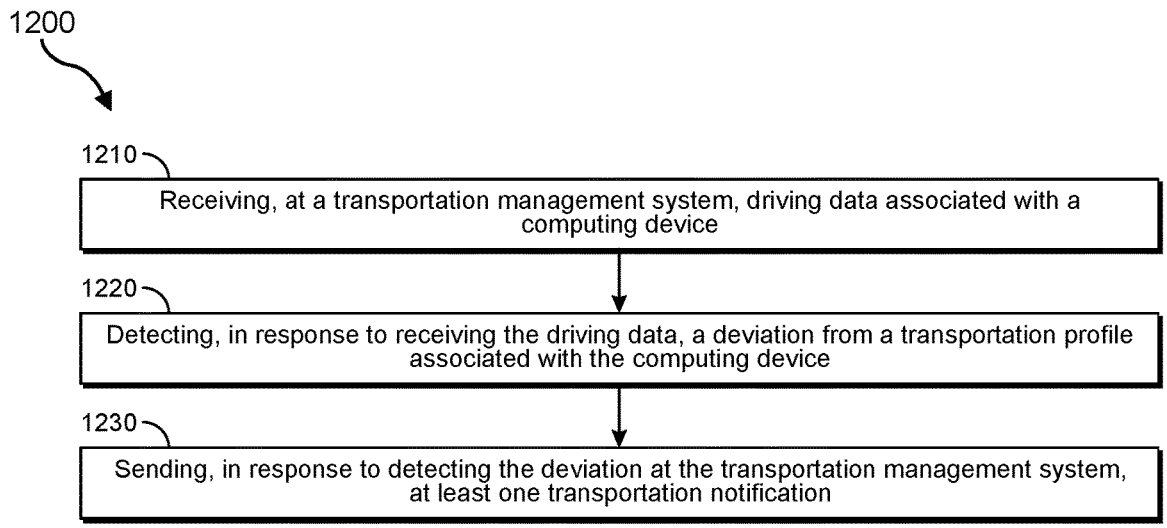
FIG. 12 is a flow diagram of an example method for issuing notifications in response to detecting deviations in transportation profiles.

FIG. 12 is a flow diagram of an exemplary computer-implemented method 1210 for creating and verifying a transportation profile. The steps shown in FIG. 12 may be performed by any suitable computer-executable code and/or computing system, including the systems illustrated in FIGS. 2-9. In one example, each of the steps shown in FIG. 12 may represent an algorithm whose structure includes and/or is represented by multiple sub-steps, examples of which will be provided in greater detail below.

As illustrated in FIG. 12, at step 1210, one or more of the systems described herein may include receiving, at a transportation management system, driving data associated with a computing device. The method may further include, at step 1220, detecting, in response to receiving the driving data, a deviation from a transportation profile associated with the computing device. The method may also include, at step 1230, sending, in response to detecting the deviation at the transportation management system, at least one transportation notification.

In some examples, the deviation may be detected by comparing the driving data with the transportation profile. In some cases, the transportation notification may include a request for biometric data, a request for a picture, a request for a picture of a driver's license, a request to conduct an interview with a live operator associated with the transportation management system, or a request to provide one or more specified inputs into a transportation application.

In some examples, the request for the biometric data may include a request to utilize a facial recognition application on the computing device. In some embodiments, the transportation notification may include a request for input from a computing device associated with a transportation request that is serviced by the computing device, and the transportation management system may receive at least one input in reply to the transportation notification from the computing device associated with the transportation request.

In some examples, the transportation notification may be sent to a computing device associated with a vehicle for providing transportation or to a computing device associated with a transportation request serviced by the vehicle. In some cases, the method may further include receiving a response to the transportation notification at the transportation management system and verifying the computing device associated with the vehicle for providing transportation based on the received response.

In some embodiments, the response to the transportation notification may be received from the computing device associated with the vehicle, and the transportation provider may be verified based, at least partially, on the response from the computing device associated with the vehicle. In some examples, the verification may be supplemented by vehicle sensor data, computing device sensor data, or data received from the computing device associated with the transportation request.

In some examples, the response to the transportation notification may be received from the computing device associated with the transportation request, and the transportation provider may be verified based, at least partially, on the response from the computing device associated with the transportation request.

In some cases, verifying the transportation provider may include verifying the authenticity of the transportation provider, or verifying a current state of the transportation provider. In some examples, the operations may further include determining that the computing device has failed a challenge associated with the transportation notification, and performing at least one disciplinary action in connection with the transportation provider.

In some examples, the method may further include determining that the computing device has passed a challenge associated with the transportation notification, and requesting a response from the computing device regarding the detected deviation. In some examples, the deviation from the transportation profile may be detected by applying a machine-learning model. In some embodiments, the operations may further include updating the machine-learning model based on one or more received responses to the transportation notification.

Figure 13:
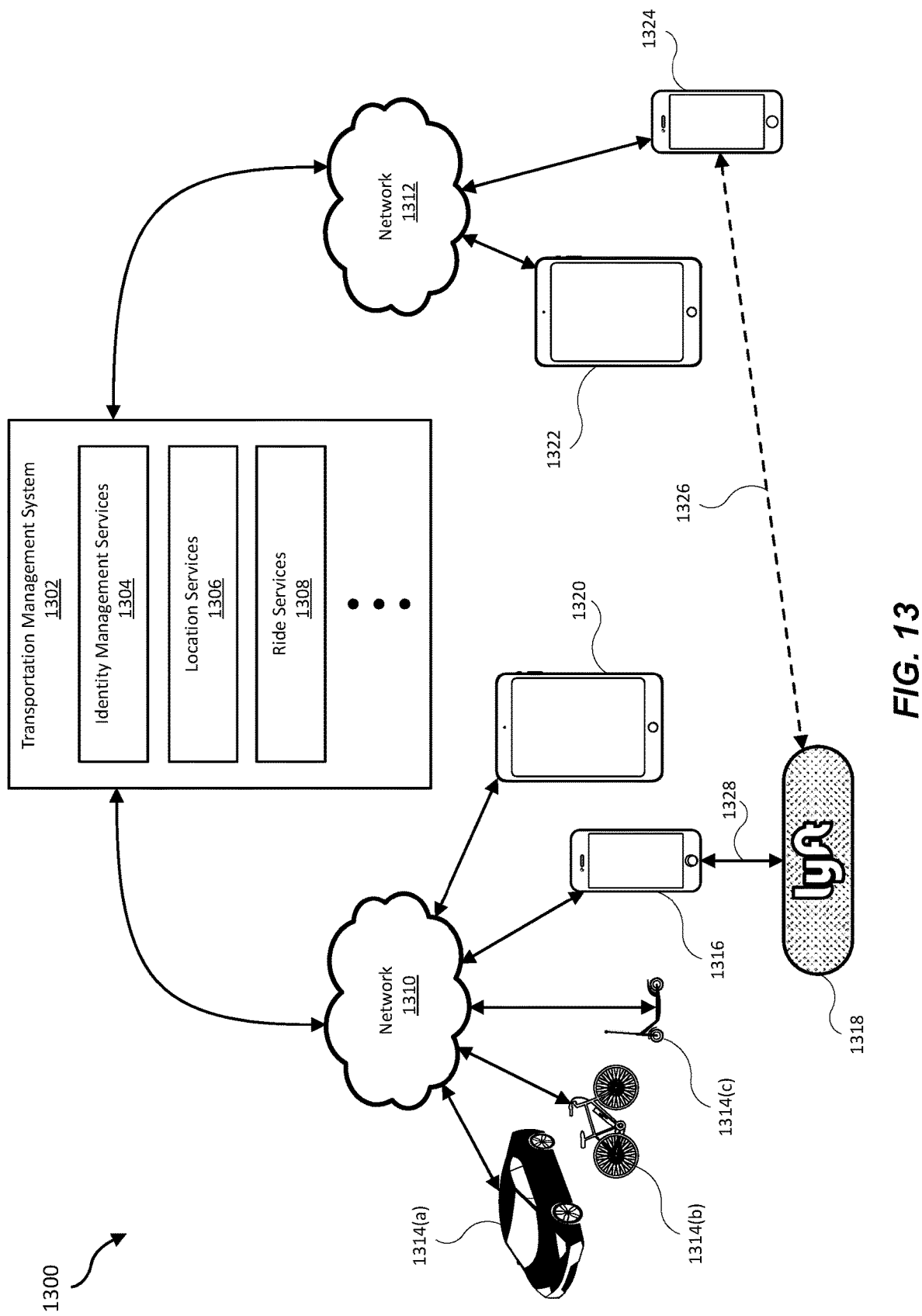
FIG. 13 is an illustration of an example requestor/provider management environment.

FIG. 13 shows a transportation management environment 1300, in accordance with various embodiments. As shown in FIG. 13, a transportation management system 1302 may run one or more services and/or software applications, including identity management services 1304, location services 1306, ride services 1308, and/or other services. Although FIG. 13 shows a certain number of services provided by transportation management system 1302, more or fewer services may be provided in various implementations. In addition, although FIG. 13 shows these services as being provided by transportation management system 1302, all or a portion of any of the services may be processed in a distributed fashion. For example, computations associated with a service task may be performed by a combination of transportation management system 1302 (including any number of servers, databases, etc.), one or more devices associated with a provider (e.g., devices integrated with managed vehicles 1314(*a*), 1314(*b*), and/or 1314(*c*); provider computing devices 1316 and tablets 1320; and transportation management vehicle devices 1318), and/or more or more devices associated with a ride requestor (e.g., the requestor's computing devices 1324 and tablets 1322). In some embodiments, transportation management system 1302 may include one or more general purpose computers, server computers, clustered computing systems, cloud-based computing systems, and/or any other computing systems or arrangements of computing systems. Transportation management system 1302 may be configured to run any or all of the services and/or software components described herein. In some embodiments, the transportation management system 1302 may include an appropriate operating system and/or various server applications, such as web servers capable of handling hypertext transport protocol (HTTP) requests, file transfer protocol (FTP) servers, database servers, etc.

In some embodiments, identity management services 1304 may be configured to perform authorization services for requestors and providers and/or manage their interactions and/or data with transportation management system 1302. This may include, e.g., authenticating the identity of providers and determining that they are authorized to provide services through transportation management system 1302. Similarly, requestors' identities may be authenticated to determine whether they are authorized to receive the requested services through transportation management system 1302. Identity management services 1304 may also manage and/or control access to provider and/or requestor data maintained by transportation management system 1302, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1302 may also manage and/or control access to provider and/or requestor data stored with and/or obtained from third-party systems. For example, a requester or provider may grant transportation management system 1302 access to a third-party email, calendar, or task management system (e.g., via the user's credentials). As another example, a requestor or provider may grant, through a mobile device (e.g., 1316, 1320, 1322, or 1324), a transportation application associated with transportation management system 1302 access to data provided by other applications installed on the mobile device. In some examples, such data may be processed on the client and/or uploaded to transportation management system 1302 for processing.

In some embodiments, transportation management system 1302 may provide ride services 1308, which may include ride matching and/or management services to connect a requestor to a provider. For example, after identity management services 1304 has authenticated the identity a ride requestor, ride services 1308 may attempt to match the requestor with one or more ride providers. In some embodiments, ride services 1308 may identify an appropriate provider using location data obtained from location services 1306. Ride services 1308 may use the location data to identify providers who are geographically close to the requestor (e.g., within a certain threshold distance or travel time) and/or who are otherwise a good match with the requestor. Ride services 1308 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services 1308 may use rule-based algorithms and/or machine-learning models for matching requestors and providers.

Transportation management system 1302 may communicatively connect to various devices through networks 1310 and/or 1312. Networks 1310 and 1312 may include any combination of interconnected networks configured to send and/or receive data communications using various communication protocols and transmission technologies. In some embodiments, networks 1310 and/or 1312 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1310 and/or 1312 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, networks 1310 and/or 1312 may include any combination of networks described herein or any other type of network capable of facilitating communication across networks 1310 and/or 1312.

In some embodiments, transportation management vehicle device 1318 may include a provider communication device configured to communicate with users, such as providers, requestors, pedestrians, and/or other users. In some embodiments, transportation management vehicle device 1318 may communicate directly with transportation management system 1302 or through another provider computing device, such as provider computing device 1316. In some embodiments, a requestor computing device (e.g., device 1124) may communicate via a connection 1326 directly with transportation management vehicle device 1318 via a communication channel and/or connection, such as a peer-to-peer connection, Bluetooth connection, NFC connection, ad hoc wireless network, and/or any other communication channel or connection. Although FIG. 13 shows particular devices communicating with transportation management system 1302 over networks 1310 and 1312, in various embodiments, transportation management system 1302 may expose an interface, such as an application programming interface (API) or service provider interface (SPI) to enable various third parties which may serve as an intermediary between end users and transportation management system 1302.

In some embodiments, devices within a vehicle may be interconnected. For example, any combination of the following may be communicatively connected: vehicle 1314, provider computing device 1316, provider tablet 1320, transportation management vehicle device 1318, requestor computing device 1324, requestor tablet 1322, and any other device (e.g., smart watch, smart tags, etc.). For example, transportation management vehicle device 1318 may be communicatively connected to provider computing device 1316 and/or requestor computing device 1324. Transportation management vehicle device 1318 may establish communicative connections, such as connections 1326 and 1328, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1302 using applications executing on their respective computing devices (e.g., 1316, 1318, 1320, and/or a computing device integrated within vehicle 1314), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1314 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1302. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 14:
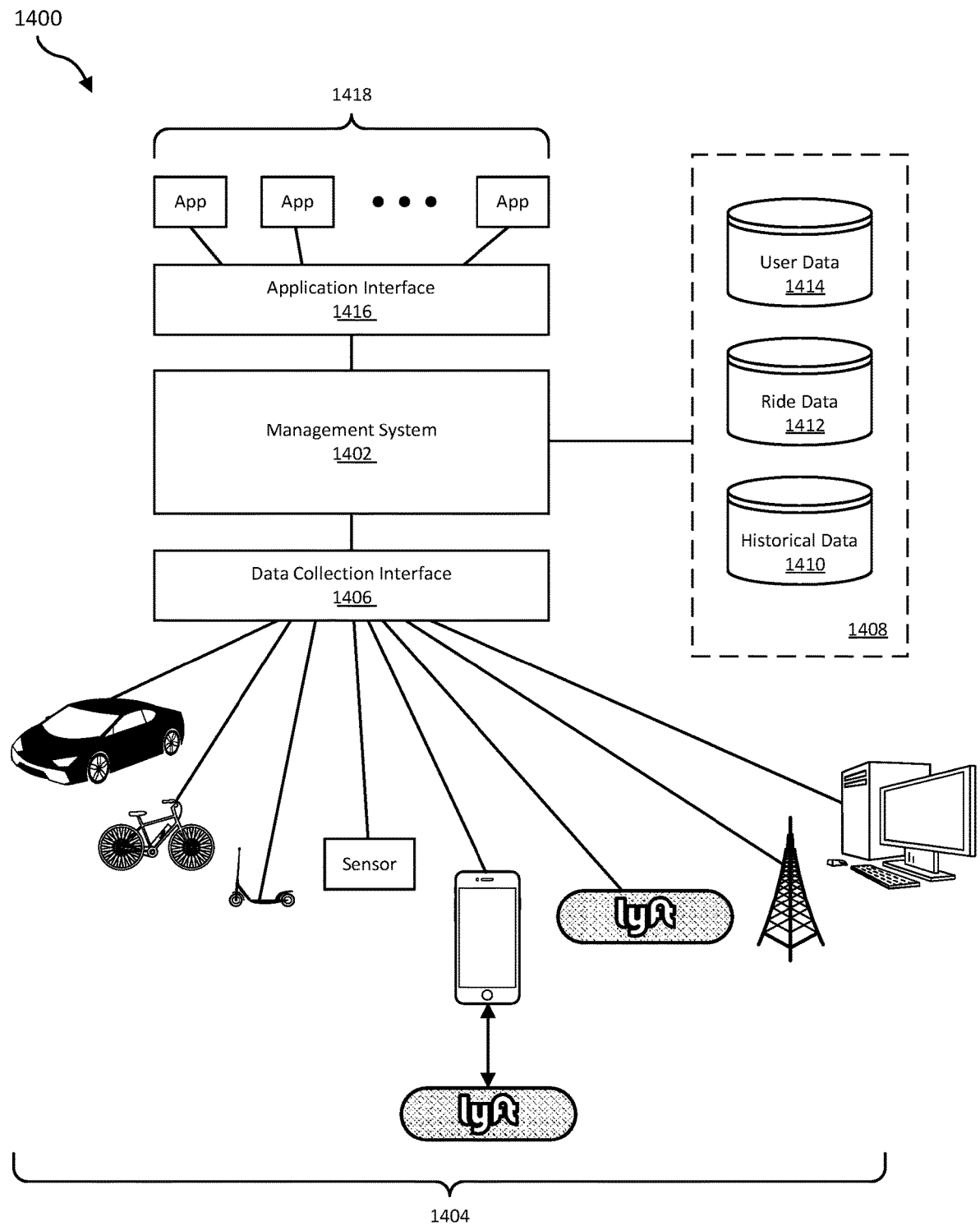
FIG. 14 is an illustration of an example data collection and application management system.

FIG. 14 shows a data collection and application management environment 1400, in accordance with various embodiments. As shown in FIG. 14, management system 1402 may be configured to collect data from various data collection devices 1404 through a data collection interface 1406. As discussed above, management system 1402 may include one or more computers and/or servers or any combination thereof. Data collection devices 1404 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1406 can include, e.g., an extensible device framework configured to support interfaces for each data collection device. In various embodiments, data collection interface 1406 may be extended to support new data collection devices as they are released and/or to update existing interfaces to support changes to existing data collection devices. In various embodiments, data collection devices may communicate with data collection interface 1406 over one or more networks. The networks may include any network or communication protocol as would be recognized by one of ordinary skill in the art, including those networks discussed above.

As shown in FIG. 14, data received from data collection devices 1404 can be stored in data 1408. Data 1408 may include one or more data stores, such as databases, object storage systems and services, cloud-based storage services, and other data stores. For example, various data stores may be implemented on a non-transitory storage medium (e.g., a non-transitory memory) accessible to management system 1402, such as historical data 1410, ride data 1412, and user data 1414. Data stores 1408 can be local to management system 1402, or remote and accessible over a network, such as those networks discussed above or a storage-area network or other networked storage system. In various embodiments, historical data 1410 may include historical traffic data, weather data, request data, road condition data, or any other data for a given region or regions received from various data collection devices. Ride data 1412 may include route data, request data, timing data, and other ride related data, in aggregate and/or by requestor or provider. User data 1414 may include user account data, preferences, location history, and other user-specific data, each of which may only be gathered, stored, and/or maintained in response to a user proactively agreeing or opting-in to the same. Although certain data stores are shown by way of example, any data collected and/or stored according to the various embodiments described herein may be stored in data stores 1408.

As shown in FIG. 14, an application interface 1416 can be provided by management system 1402 to enable various apps 1418 to access data and/or services available through management system 1402. Apps 1418 may run on various user devices (including provider and requestor computing devices, such as those discussed above) and/or may include cloud-based or other distributed apps configured to run across various devices (e.g., computers, servers, or combinations thereof). Apps 1418 may include, e.g., aggregation and/or reporting apps which may utilize data 1408 to provide various services (e.g., third-party ride request and management apps). In various embodiments, application interface 1416 can include an API and/or SPI enabling third party development of apps 1418. In some embodiments, application interface 1416 may include a web interface, enabling web-based access to data 1408 and/or services provided by management system 1402. In various embodiments, apps 1418 may run on devices configured to communicate with application interface 1416 over one or more networks. The networks may include any network or communication protocol as would be recognized by one of ordinary skill in the art, including those networks discussed above, in accordance with an embodiment of the present disclosure.

In this manner, the embodiments described herein may be implemented to create a transportation profile associated with a transportation provider and use that transportation profile to determine whether the transportation provider is authentic. If a transportation provider is suspected of fraudulence, a notification or verification challenge may be issued to the transportation provider to provide inputs that may indicate whether the transportation provider is authentic or not, or is simply fatigued and should cease driving for the day. In this manner, the number of fraudulent providers may be reduced within the system, thus leading to safer transportation for transportation requestors.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising".

What is claimed is:

1. A system comprising:
  a non-transitory memory; and
  one or more hardware processors configured to execute instructions from the non-transitory memory to perform operations comprising:
    verifying the authenticity of a transportation provider, in real time, based on computer-generatable data indicative of a way the transportation provider drives by:
      receiving, at a transportation management system, driving data collected via one or more sensors associated with a computing device of the transportation provider;
      generating, for the transportation provider, a transportation profile comprising one or more historical driving patterns identified based on the driving data;
      collecting current driving data in real time via the one or more sensors; and
      comparing the current driving data to the historical driving patterns;

automatically detecting in real time, based on the current driving data, a deviation from the one or more historical driving patterns of the transportation profile;

determining a potential lack of authenticity based on the automatically detected deviation; and in response to the potential lack of authenticity, determined based on the automatically detected deviation, automatically sending, to the transportation provider's computing device, at least one transportation notification for initiating a digital transportation provider verification process for digitally verifying the identity of the transportation provider.

2. The system of claim 1, wherein automatically detecting the deviation comprises:

monitoring a current driving behavior based on the current driving data; and comparing the current driving behavior with the historical driving patterns of the transportation profile.

3. The system of claim 1, wherein the transportation notification comprises at least one of:

a request for providing biometric data via the transportation provider's computing device;

a request to utilize a facial recognition application on the transportation provider's computing device to perform a live face scan;

a request for providing a digital picture via the transportation provider's computing device;

a request for providing a live video feed via the transportation provider's computing device;

a request for providing a picture of a driver's license via the transportation provider's computing device;

a request to conduct an interview with a live operator associated with the transportation management system; or a request to provide one or more specified inputs into a transportation application.

4. The system of claim 1, wherein the driving data comprises at least one of:

location data, collected via a GPS radio, for a vehicle of the transportation provider; or light data collected via an ambient light sensor.

5. The system of claim 1, wherein the driving data comprises at least one of:

telemetry data, collected via an accelerometer, comprising at least one of an acceleration rate, a deceleration rate, or an average acceleration rate of a vehicle associated with the transportation provider; or movement data, collected via at least one of a gyroscope or a magnetometer, for the vehicle.

6. The system of claim 1, wherein the driving data collected via the one or more sensors comprises at least one of:

data associated with how quickly a vehicle associated with the transportation provider's computing device turns;

data associated with how quickly the vehicle stops;

data associated with how often the transportation provider stays within driving lanes;

data associated with how often the transportation provider comes to a complete stop at stops signs or stop lights;

data associated with how often the transportation provider honks a horn;

data associated with how often the transportation provider uses a turn signal; or data associated with at least one of a frequency or degree of sudden movements by the vehicle.

7. The system of claim 6, wherein the operations further comprise:

receiving a response to the transportation notification at the transportation management system; and verifying the transportation provider's computing device associated with the vehicle for providing transportation based on the received response.

8. The system of claim 1, wherein the verification is supplemented by at least one of:

vehicle sensor data;

computing device sensor data; or data received from a computing device associated with a transportation request.

9. The system of claim 1, wherein the one or more historical driving patterns comprise vehicle operation patterns that identify how the transportation provider operates a vehicle in a plurality of designated situations and conditions.

10. The system of claim 1, wherein the historical driving patterns differentiates between at least one of:

nighttime and daytime driving;

city and suburb driving;

driving during different weather conditions;

driving with a passenger and driving without a passenger;

driving with a package or meal and driving with a passenger; or driving at a beginning portion of a shift and driving at an end portion of a shift.

11. The system of claim 7, wherein the transportation provider verification process further comprises verifying a current state of the transportation provider.

12. The system of claim 1, wherein the operations further comprise:

determining that the transportation provider has failed the digital transportation provider verification process; and in response to determining that the transportation provider has failed the digital transportation provider verification process, performing at least one disciplinary action in connection with the transportation provider.

13. The system of claim 7, wherein the transportation profile further comprises identifying information corresponding to the transportation provider.

14. The system of claim 1, wherein the deviation from the transportation profile is automatically detected by applying a machine-learning model.

15. The system of claim 14, wherein the operations further comprise updating the machine-learning model based on one or more received responses to the transportation notification.

16. A computer-implemented method comprising:

verifying the authenticity of a transportation provider, in real time, based on computer-generatable data indicative of a way the transportation provider drives by:

receiving, at a transportation management system driving data collected via one or more sensors associated with a transportation provider's computing device;

generating, for the transportation provider, a transportation profile comprising one or more historical driving patterns identified based on the driving data;

collecting current driving data in real time via the one or more sensors; and comparing the current driving data to the historical driving patterns;

automatically detecting in real time, based on the current driving data, a deviation from the one or more historical driving patterns of the transportation profile; and determining a potential lack of authenticity based on the automatically detected deviation; and in response to the potential lack of authenticity, determined based on automatically detected deviation, automatically sending, to the transportation provider's computing device, at least one transportation notification for initiating a digital transportation provider verification process for digitally verifying the identity of the transportation provider.

17. The computer-implemented method of claim 16, wherein automatically detecting the deviation comprises:
monitoring a current driving behavior based on the current driving data; and
comparing the current driving behavior with the historical driving patterns of the transportation profile.

18. The computer-implemented method of claim 16, wherein the transportation notification comprises at least one of:
a request for providing biometric data via the transportation provider's computing device;
a request for providing a digital picture via the transportation provider's computing device;
a request for providing a live video feed via the transportation provider's computing device;
a request for providing a picture of a driver's license via the transportation provider's computing device;
a request to conduct an interview with a live operator associated with the transportation management system; or
a request to provide one or more specified inputs into a transportation application.

19. The computer-implemented method of claim 18, wherein:
the request for the biometric data comprises a request to utilize a facial recognition application on the transportation provider's computing device; and
the facial recognition application is configured to perform a live face scan.

20. A computer-readable medium comprising computer-readable instructions that, when executed by at least one processor of a computing device, cause the computing device to:
verify the authenticity of a transportation provider, in real time, based on computer-generatable data indicative of a way the transportation provider drives by:
receiving at a transportation management system, driving data collected via one or more sensors associated with a computing device of the transportation provider;
generating, for the transportation provider, a transportation profile comprising one or more historical driving patterns identified based on the driving data;
collecting current driving data in real time via the one or more sensors; and
comparing the current driving data to the historical driving patterns;
automatically detect in real time, based on the current driving data, a deviation from the one or more historical driving patterns of the transportation profile;
determine a potential lack of authenticity based on the automatically detected deviation; and
in response to the potential lack of authenticity, determined based on the automatically detected deviation, automatically send, to the transportation provider's computing device, at least one transportation notification for initiating a digital transportation provider verification process for digitally verifying the identity of the transportation provider.

* * * * *